US006341359B1

(12) United States Patent
Aiken et al.

(10) Patent No.: US 6,341,359 B1
(45) Date of Patent: Jan. 22, 2002

(54) SELF-DIAGNOSING AND SELF CORRECTING DATA ENTRY COMPONENTS

(75) Inventors: William Holland Aiken, Aptos; Frederick Thomas Sharp, Menlo Park, both of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/211,711

(22) Filed: Dec. 14, 1998

(51) Int. Cl.$^7$ .............................................. G06F 9/445
(52) U.S. Cl. ...................................................... 714/100
(58) Field of Search .................... 717/5, 1, 11; 706/56, 706/19; 382/156; 700/10, 90, 97

(56) References Cited

U.S. PATENT DOCUMENTS

| | | | |
|---|---|---|---|
| 4,884,217 A | * 11/1989 | Sheirik et al. ................. | 706/56 |
| 4,907,167 A | * 3/1990 | Sheirik ......................... | 700/10 |
| 5,103,498 A | 4/1992 | Lanier et al. | |
| 5,123,057 A | * 6/1992 | Verly et al. ................... | 382/156 |
| 5,200,888 A | * 4/1993 | Hashimoto .................... | 700/90 |
| 5,239,617 A | 8/1993 | Gardner et al. | |
| 5,390,281 A | 2/1995 | Luciw et al. | |
| 5,432,902 A | 7/1995 | Matsumoto | |
| 5,477,447 A | 12/1995 | Luciw et al. | |
| 5,497,454 A | * 3/1996 | Bates et al. .................. | 395/158 |
| 5,533,168 A | * 7/1996 | Abe et al. ..................... | 706/19 |
| 5,535,323 A | 7/1996 | Miller et al. | |
| 5,576,965 A | * 11/1996 | Akasaka et al. .............. | 700/97 |
| 5,644,735 A | 7/1997 | Luciw et al. | |
| 5,845,120 A | 12/1998 | Reddy et al. ................. | 395/704 |
| 5,920,303 A | * 7/1999 | Baker et al. ................. | 345/133 |
| 6,032,163 A | * 2/2000 | Tou et al. .................... | 707/531 |
| 6,151,702 A | * 11/2000 | Overturf et al. .............. | 717/5 |

FOREIGN PATENT DOCUMENTS

EP 0 816 991 A1 1/1998

* cited by examiner

Primary Examiner—Mark R. Powell
Assistant Examiner—Michael B. Holmes
(74) Attorney, Agent, or Firm—Gates & Cooper LLP

(57) ABSTRACT

A method, apparatus, and article of manufacture, and a memory structure for accepting data input into a computer is disclosed. The method comprises the steps of presenting a component to the user, wherein the component includes an input area for accepting the input data, and the component is subject to a constraint for the data, accepting user input into the component input area, and following an assistance policy associated with the component when the user input violates the value constraint. In one embodiment, the value constraint for the input data is organized according to the component content type. In another embodiment, the method comprises the steps of defining a component comprising an input area for accepting input data, associating the component with a value constraint according to a content type of the input area, and associating the component with an assistance policy selected from a set of assistance policies. The article of manufacture comprises a program storage device tangibly embodying instructions for performing the method steps defined above. The apparatus comprises a means for presenting a component including an input area for accepting user input from the user, wherein the component is subject to a constraint for the input data according to component content type, means for accepting user input into the component input area, and means for enforcing an assistance policy associated with the component when the user input violates the value constraint.

51 Claims, 20 Drawing Sheets

SELF-DIAGNOSING AND SELF CORRECTING DATA ENTRY COMPONENTS

CROSS-REFERENCE TO RELATED APPLICATIONS

This application is related to the following co-pending and commonly assigned patent application, which are hereby incorporated by reference herein:

application Ser. No. 09,211,544, entitled "SELF-DIAGNOSING AND SELF-CORRECTING DATA ENTRY COMPONENTS WITH DEPENDENCY BEHAVIOR," filed on same date herewith, by William H. Aiken and Frederick T. Sharp, attorney's docket number ST9-98-092; and application Ser. No. 099,211,712, entitled "FORMATTED-ITEM LIST CONTROL," filed on same date herewith, by Frederick T. Sharp, attorney's docket number ST9-98-093.

BACKGROUND OF THE INVENTION

1. Field of the Invention

The present invention relates to systems and methods of accepting data entry into a computer, and in particular to the use of intelligent components and text areas for diagnosing and correcting data entry errors.

2. Description of the Related Art

Graphical user interfaces (GUIs) provide an easy to use, intuitive computer interface. A GUI typically includes a number of components such as input fields or areas that allow the user to enter data for computer program parameters or variables. GUI input fields or areas can also be used to accept user input defining parameter or variable names and characteristics.

In many cases, the parameters or variables (and hence, the data entered into the input fields) are subject to value and/or format constraints. Users must adhere to these constraints when entering data into the fields, or errors will result. For example, DOS filenames cannot exceed eight characters, optionally followed by a period and an extension that cannot exceed three characters, and cannot include characters such as backslashes. Database object names, such as names for tables and stored procedure parameter names, have similar restrictions.

Multiple related input fields, each for different parameters or variables, may be grouped together and presented to the user in a dialog box or window. After data has been entered into the required input fields, the user may select an "OK" button, and the data in each field is accepted and stored accordingly.

A GUI can respond in many ways when the user violates an input field constraint. One way to respond is to wait until the user tries to commit all changes, then beep and present a dialog box informing the user of the error and information to educate the user as to the proper input form. One drawback of this technique is that it is often difficult for the user to associate the information in the dialog box with the constraint violation. For example, if the user entered data into multiple fields, the user will not know which input field is incorrect. The user must click OK on the error message dialog, associate the error message with the input field in error, select the text in the field in error, and then make the correction. This behavior maximizes the effort needed to commit a change that doesn't violate any constraint.

Another way the GUI can respond to an erroneous input is to fix the errors without asking for user intervention. For example, if a comment field cannot contain a specific set of impermissible characters, those characters could be automatically stripped out before the comment is committed. This technique has disadvantages as well. First, the user may want the impermissible characters, not realize they have disappeared, and write new code that depends on their entry. This technique also does nothing to educate the user, and even worse, misleads the user into thinking no constraint has been violated.

Another way the GUI can attempt to solve the foregoing problems by avoiding the use of input fields altogether. For example, a length parameter can be specified with a slider bar or a combo box with all possible values in it. This technique is feasible for some parameters (e.g. specifying decimal precision, which generally ranges only between 0 and 31), and infeasible for others (i.e. specifying a BLOB length, which ranges from 1 to 2 gigabytes). Such controls avoid problems with lower and upper limits, and can also reflect context changes. However, such controls are not as flexible as editable text fields. For example, only an editable text field is suitable in cases where the same control (for consistency reasons) must serve as the length of (alternatively) a BLOB and a DECIMAL precision. Further, the name of a new object cannot ordinarily be specified with any other type of control other than an editable text field.

As is apparent from the foregoing, there is a need for a computer interface that validates user-entered data and provides the user with timely, diagnostic information on a field by field basis. The present invention satisfies that need.

SUMMARY OF THE INVENTION

To address the requirements described above, the present invention discloses a method, apparatus, article of manufacture for accepting data input into a computer.

The method comprises the steps of presenting a component to the user, wherein the component includes an input area for accepting the input data, and the component is subject to a value constraint for the data, accepting user input into the component input area, and following one or more assistance policies associated with the component when the user input violates the value constraint. The assistance policies govern notification of constraint violations, how and whether user values are corrected, and how values should be changed in relation to other components.

In one embodiment, the value constraint for the input data is organized according to the component content type. In another embodiment, the method comprises the steps of defining a component comprising an input area for accepting input data, associating the component with a value constraint according to a content type of the input area, and associating the component with an assistance policy selected from a set of assistance policies. The article of manufacture comprises a program storage device tangibly embodying instructions for performing the method steps defined above.

The apparatus comprises a means for presenting a component including an input area for accepting user input from the user, wherein the component is subject to a value constraint for the input data according to the type of its content, means for accepting user input into the component input area, and means for enforcing one or more assistance policies associated with the component when the user input violates the value constraint.

BRIEF DESCRIPTION OF THE DRAWINGS

Referring now to the drawings in which like reference numbers represent corresponding parts throughout.

DETAILED DESCRIPTION OF PREFERRED EMBODIMENT

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware Environment

Figure 1:
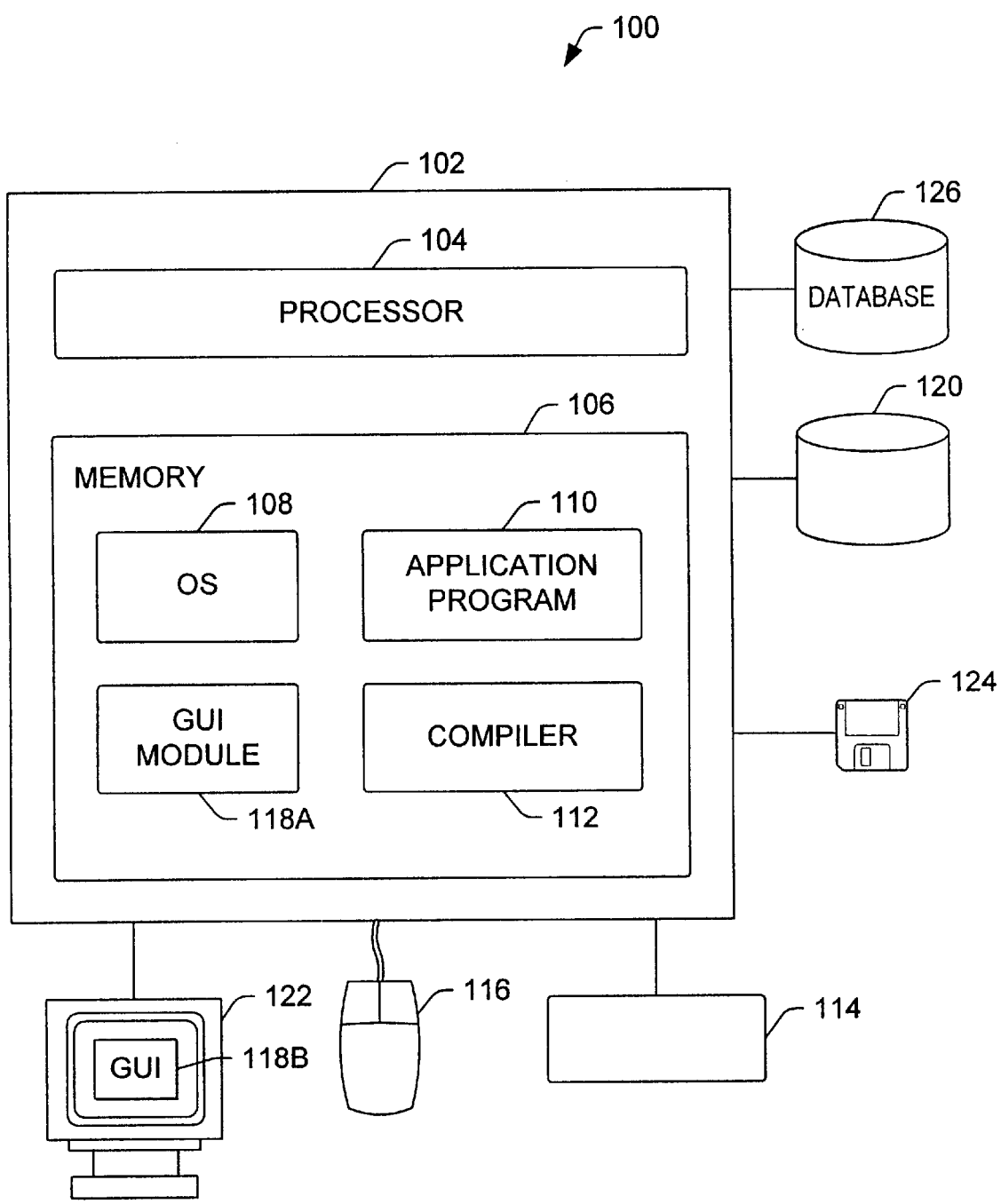
FIG. 1 is a block diagram showing an exemplary hardware environment for practicing the present invention.

FIG. 1 illustrates an exemplary computer system 100 used to implement a multiple browser and editor. The computer 102 comprises a processor 104 and a memory 106, such as random access memory (RAM). The computer 102 is operatively coupled to a display 122, which presents images to the user. The computer 102 may be coupled to other devices, such as a keyboard 114, a mouse device 116, a printer, or similar I/O device. Any combination of the above components, or any number of different components, peripherals, and other devices, may be used with the computer 102.

Generally, the user interfaces with the computer which accepts inputs and commands and presents results through a graphical user interface (GUI) module 118A and GUI 118B. Although the GUI module 118A is depicted as a separate module, the instructions performing the GUI functions can be resident or distributed in the operating system 108, the application program 110, or implemented with special purpose memory and/or processors.

The operating system 108 and computer application program 110 are comprised of instructions which, when read and executed by the computer 102, causes the computer 102 to perform the steps necessary to implement and/or use the present invention. Computer program 110 and/or operating instructions may also be tangibly embodied in memory 106 and/or provided via data communications devices, thereby making a computer program product or article of manufacture according to the invention. As such, the terms "article of manufacture" and "computer program product" as used herein are intended to encompass a computer program accessible from any computer readable device or media. In one embodiment, instructions implementing the operating system 108, the computer program 110, and the compiler 112 are tangibly embodied in a computer-readable medium, e.g., data storage device 120, such as one or more fixed or removable data storage devices, a zip drive, floppy disc drive 124, hard drive, CD-ROM drive, tape drive, or other medium.

The computer 102 may also implement a compiler 112 which allows an application program 110 written in a programming language such as COBOL, C++, FORTRAN, or other language to be translated into processor 104 readable code. After completion, the application program 110 accesses and manipulates data stored in the memory 106 of the computer 102 using the relationships and logic that was generated using the compiler 112.

Those skilled in the art will recognize many modifications may be made to this configuration without departing from the scope of the present invention. For example, those skilled in the art will recognize that any combination of the above components, or any number of different components, peripherals, and other devices, may be used with the present invention.

Overview

The present invention combines a set of usability features into GUI edit components that enforce appropriate constraints and provide correct default values for a given context. Constraints, including value and/or format input constraints are imposed upon input data based upon the content type. A variety of component content types are supported, including all SQL identifiers and length fields. When a user enters input that violates one of the constraints, errors are repaired and diagnostic messages are displayed as provided by one of a set of one or more assistance policies. The assistance policies govern how to signal errors, such as by presenting a highlighted or thickened red border around the input area, automatically repairing errors without user intervention, and displaying a diagnosis message in a "popup" box in a given position relative to the component in error when the component is in focus.

The present invention also checks to assure that input is received for required values, and also checks to assure that the selected input does not violate uniqueness constraints (preventing the user from selecting a variable name that duplicates an existing name). In some circumstances, the constraints for a particular input field are dependent upon the data entered for another input field. In such circumstances, the present invention also validates dependent fields to assure that such constraints are not violated.

The input area or fields have four separately configurable borders. By default, when they are disabled or not in focus (indicating the object displayed will accept keyboard input), the borders have the same appearance as a normal field or area. When a field or area is in focus, however, a plain, blue border is displayed, distinguishing the assistance field from a normal field. When the value input into a field violates the constraints, the field displays a double-thick red border.

Process

Figure 2:
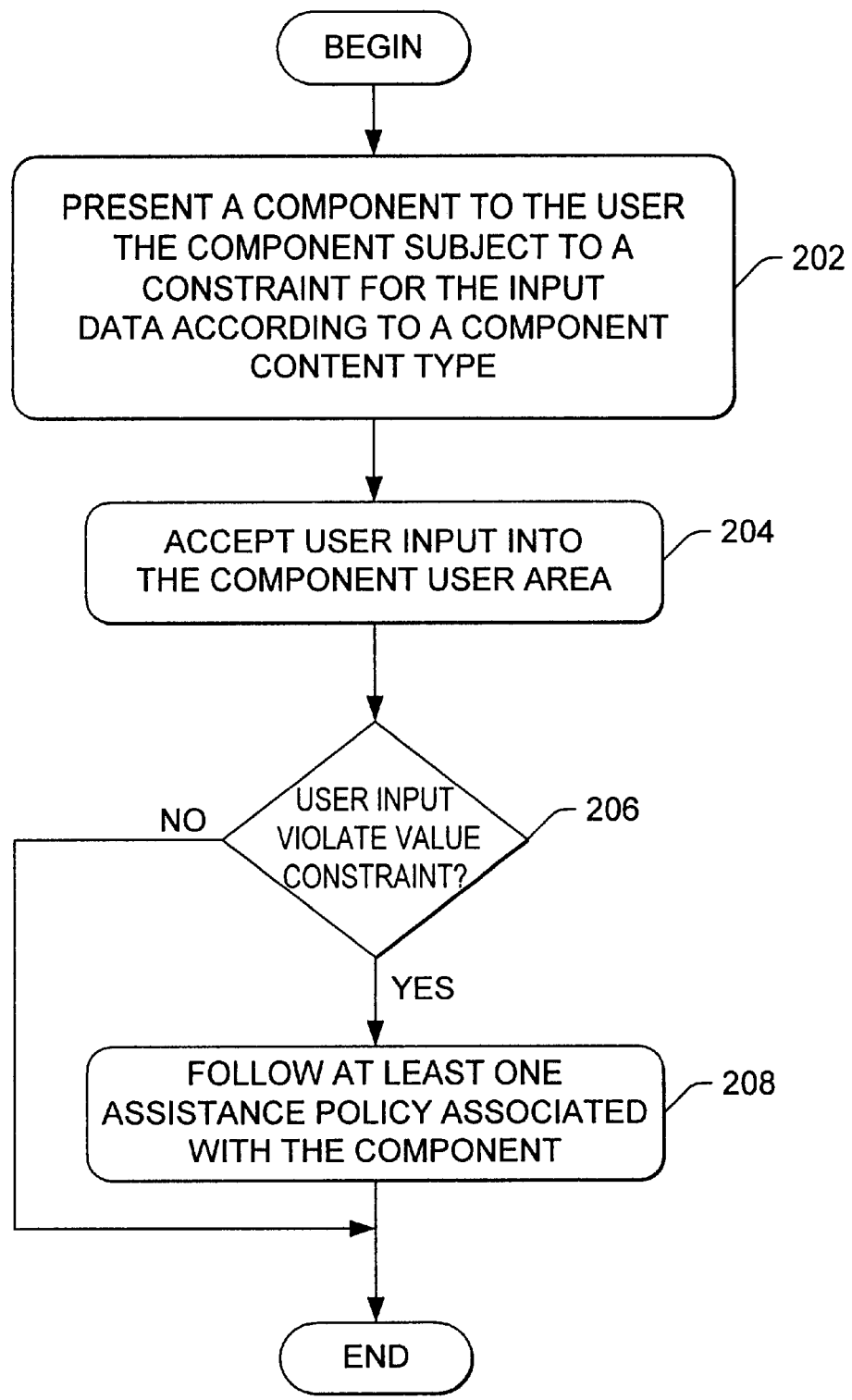
FIG. 2 is a flow chart presenting an illustrative example of process steps used in accepting input data from a user in an input component.

FIG. 2 is a flow chart showing the operations used to practice an exemplary embodiment of the present invention. The operations described with respect to FIG. 2 will be described with reference to FIGS. 4 and 5 to show exemplary embodiments of a GUI used in performing the operations described in FIG. 2.

First, an input component is defined and is presented to a user, as shown in block 202. A component (or control) is a graphical user interface device that responds to events raised by user input (using a mouse, keyboard, or voice, for example). The component includes an input area where the user enters the input data. The component may one of many difference types. For example, the component may comprise a simple input field, an input area with scroll bars, a spin box, a series of radio buttons or check boxes, a button, table, label, listbox, scrollbar, text field, or combo box.

The component is subject to one or more constraints for the input data, and an assistance policy which defines which actions are to be taken if the component constraints are violated. Next, the component accepts user input into the component input area. This is depicted in block 204. The user input data is then checked by the component to determine whether the constraints associated with the component are violated, as shown in block 206. If the user input violated a constraint, the assistance policy associated with the component is followed. This is depicted in block 208.

Input fields can be dynamically configured to many field types including those relevant to C, C++, and Java. The field types are relevant to various programming languages. In one embodiment, the field types are relevant to SQL for accessing a relational database product such as IBM DB2, and include the following:

SQL_SHORT_IDENTIFIER—A short SQL identifier that can be qualified with a schema, if desired, depending on a qualifyPolicy setting.

SQL_LONG_IDENTIFIER—A long SQL identifier that can be qualified with a schema, if desired, depending on a qualifyPolicy setting.

SQL_SHORT_IDENTIFIER_QUALIFY_NEVER—A short SQL identifier that can not be qualified with a schema.

SQL_LONG_IDENTIFIER_QUALIFY_NEVER—A long SQL identifier that can not be qualified with a schema.

SQL_SHORT_IDENTIFIER_QUALIFY_OPTIONAL—A short SQL identifier that can optionally be qualified by a schema. The schema is validated separately from the remainder of the identifier.

SQL_LONG_IDENTIFIER_QUALIFY_OPTIONAL—A long SQL identifier that can optionally be qualified by a schema. The schema is validated separately from the remainder of the identifier.

SQL_COMMENT_254—An SQL comment with a maximum length of 254 characters and no white spaces (such as tabs or carriage returns) except for a space character.

SQL_LENGTH—A length for a dynamically specified SQL string type. When the type is a SQL LOB, it can be paired with another component that lets the user specify the magnitude (e.g. bytes, kilobytes, megabytes, or gigabytes).

SQL_PRECISION—A DECIMAL precision and must be paired with an SQL_SCALE component.

SQL_SCALE—A DECIMAL scale that must be paired with an SQL_PRECISION component.

Figure 3:
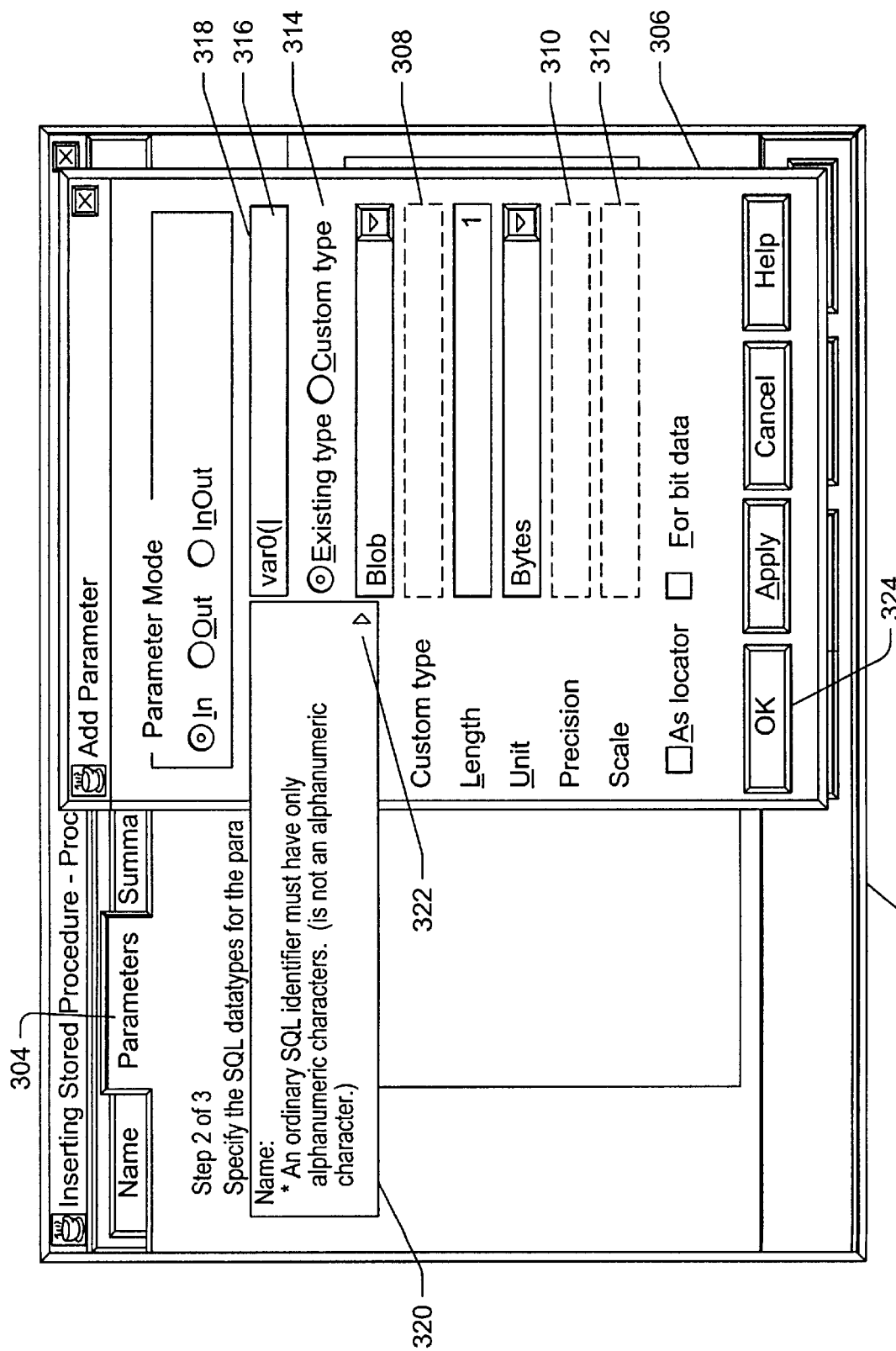
FIG. 3 is a diagram showing and exemplary embodiment of a GUI used in performing the operations shown in FIG. 2.

FIG. 3 is an exemplary embodiment of a GUI used in performing the operations shown in FIG. 2. The GUI comprises a first window 302 for inserting a stored procedure in a DB2 database. The user has selected a parameters tab 304, and has selected an option to add a new parameter, thus displaying an add parameter dialog box 306. All of the text and combo boxes in the add parameter dialog box 306 are assistance components (the Custom type 308, Precision 310, and Scale 312 fields have been set to clear their values when they are disabled). The name field 314 is enabled and an invalid value ("var0(") has been entered into the input area 316. Because the value entered violated one of the constraints associated with the name field 314, the border 318 around the name field 314 is double-thickened and colored red, and a diagnostic pop-up 320 is presented to display a diagnostic message to the user. The diagnostic explains why the input value violated a constraint. In the illustrated case, the user has input a "(" character. The border 318 was changed and the diagnostic pop-up 320 was displayed because ordinary SQL identifiers are constrained to include only alphanumeric characters and "(" is not an alphanumeric character. SQL identifiers may be ordinary or delimited. (An ordinary identifier must begin with an alphabetic character and contain only alphanumeric characters or underscore characters. A delimited identifier begins and ends with delimiters, such as double quotation marks, and has no character restrictions except that internal double quotation marks must be doubled, e.g. "The ""Fab"" Four"). No diagnostic or border manipulation is performed for the length field, because it has a valid value ("1"). If the user wants additional information or options, arrow 322 can be selected.

Figure 4:
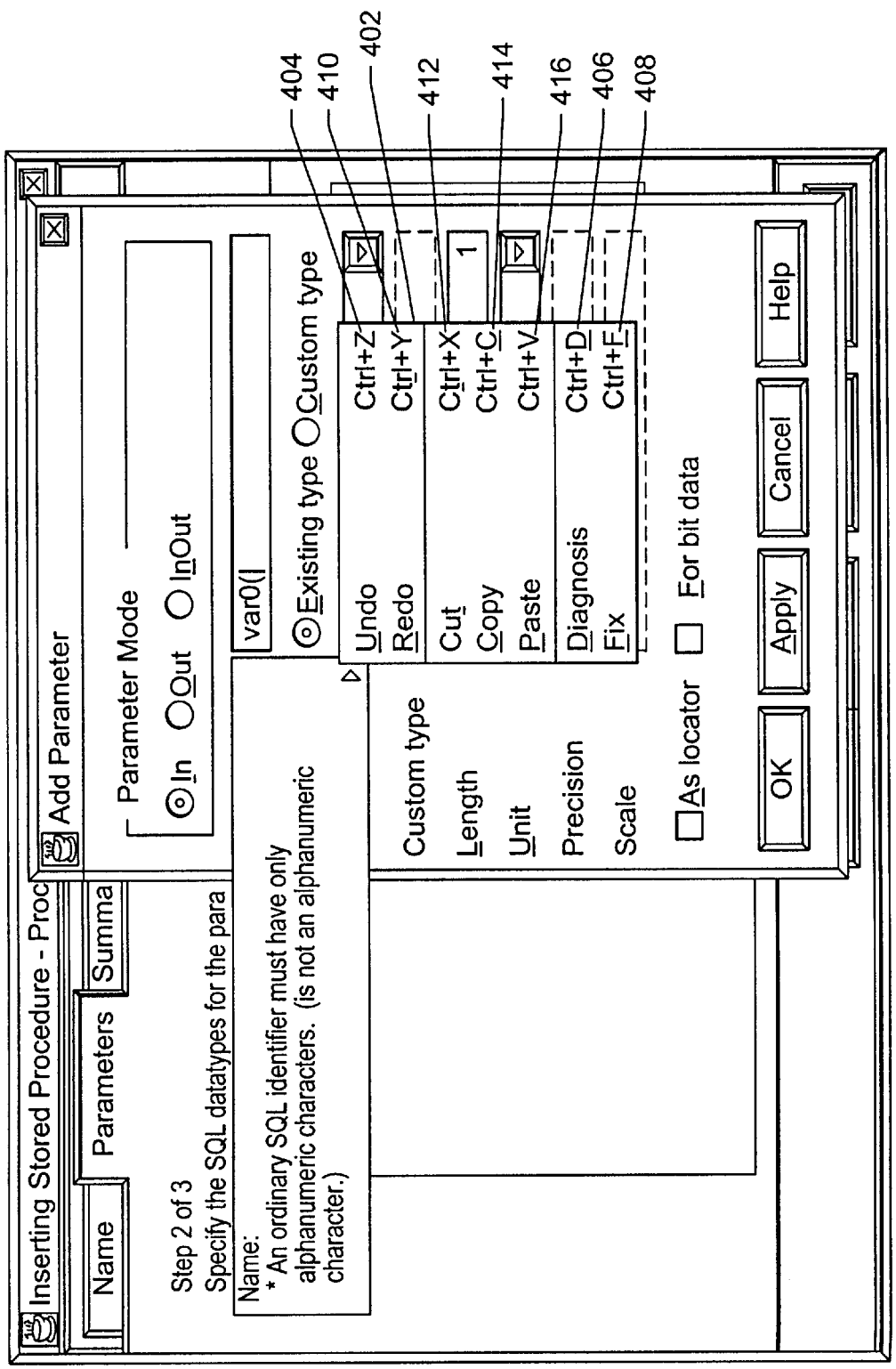
FIG. 4 is a diagram showing an exemplary embodiment of the GUI presented when a pop-up menu is selected from the pop-up dialog.

FIG. 4 is an exemplary embodiment of the GUI presented to the user when the arrow 322 is selected. A pop-up menu 402 is presented, providing the user with several options, including an undo option 404, a diagnosis option 406 and a fix option 408. The fix option 408 is selected if the user would like the error corrected without further user intervention. In this case, the fix option will remove the open parenthesis from the field. The diagnosis option 406 is selected if the user would like to repeat the diagnosis for the field, and the undo option will remove the user input from the field. Other options, including a redo option 410, a cut option 412, a copy option 414, and a paste option 416 are also presented, but because these options are not applicable in the current context, they are unselectable, and are grayed to indicate as such.

Figure 5:
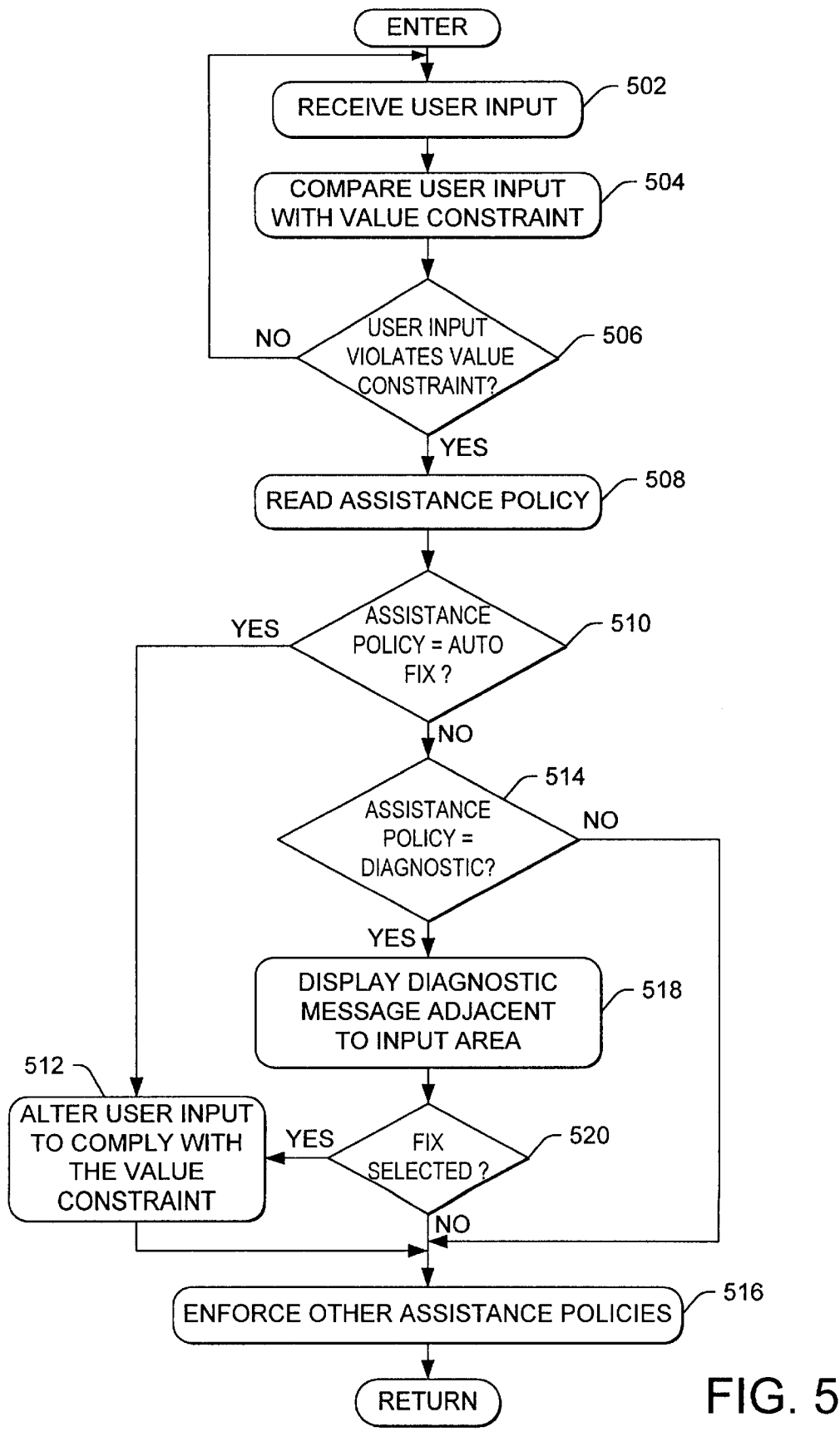
FIG. 5 is a block diagram illustrating additional detail regarding the acceptance of user data and the process of following assistance policies.

FIG. 5 is a block diagram illustrating additional detail regarding the accepting of user data and the following of assistance policies. First, the user input into the input area is received 502 by the component. The user input is then filtered to screen non-data input keys (such as up and down arrows). The received user input is then compared 504 with a constraint. This is accomplished when the component calls a validate routine such as utility or a method in a utility class. The validate method obtains the value of the user input. If the user input does not violate the constraint, the validate method answers with a return code indicating that no constraint was violated, and processing returns to await further user input. If the user input violates the constraint, the validate method reads the policies, and depending on the policy selections, provides a return code indicating that a constraint has been violated. This is depicted in blocks 506 and 508. The validate method can be implemented as a separate utility, if desired.

In the foregoing embodiment, user input is compared 504 with the constraint after each keyboard entry. It is also possible (and desirable for some constraints) to defer comparison of the user input with the constraint until after all user input has been entered into the input area 316.

The software developer can customize policies as desired. Each policy has a variable value, with a default, that is available to all assistance components; further, some policies are also kept in each component, so that each component may override the global settings if the developer wishes. Most policies are Boolean, that is, either true or false. Two—diagnosis and assistanceTipPosition—have a set of possible values. The values for assistanceTipPosition signify the position—top, left, bottom, right, and nowhere— also, other positions are possible, such as upper right and so forth). One, delayDiagnosis, can be set to zero or the number of milliseconds to delay before displaying a diagnosis. It is also possible to delay verification of each keyboard entry if another keyboard entry follows within a specified time (this is the purpose of the delayDiagnosis policy). The four borders are border objects. Other policies could have other data types. In one embodiment, the present invention comprises the following assistance policies:

BEEP FOR ERRORS—If beepPolicy is set to true, constraint violations are signaled with a beep or other aural feedback. Ordinarily, beepPolicy is defaulted to a logical true state.

FIX ERRORS AUTOMATICALLY—If fixPolicy is set to true, errors are automatically and immediately repaired. If not set to true, the border 318 is doubled and colored red. Ordinarily, fixPolicy is defaulted to a logical false state.

UPPERCASE ORDINARY IDENTIFIERS—If upperPolicy is set true, ordinary (not delimited) SQL identifiers are folded to uppercase. Ordinarily, upperPolicy is defaulted to a logical false state.

DOUBLE AND CLOSE DELIMITERS—If delimiterPolicy is set true, closing delimiters are supplied immediately, as are double internal quotation marks when the identifier begins with a delimiter. Ordinarily, delimiterPolicy is defaulted to a logical true state.

ACCEPT ANY CHARACTER IN IDENTIFIERS—If anyCharPolicy is set true, opening and closing delimiters are supplied when an SQL identifier is fixed, instead of removing illegal characters. Ordinarily, the anyCharPolicy is defaulted to a logical false state.

SCALE LOB LENGTH TO MAGNITUDE—If scaleLOBLLengthPolicy is set true, the LOB length is divided and multiplied when the magnifier changes. If scaleLOBLLengthPolicy is not set true, the LOB length is checked to assure that the limits are not violated. Ordinarily, the scaleLOBLLengthPolicy is defaulted to a logical true state.

ASSISTANCE TIP POSITION—The tipLocationPolicy is set to a constant positive number defined by the AssistanceTipManager or to a negative number. If tipLocationPolicy is a positive number, by default, the assistance component calls the AssistanceTipManager to display a diagnosis in the specified location relative to the field (top, right, bottom, or left, based upon the number provided). If negative, no call is made. This value may be overridden in each assistance component.

DELAY DIAGNOSES—If delayPolicy is set greater than zero, an assistance component delays before notifying the user or other listeners of a diagnosis. The default value for delayPolicy is zero.

DIAGNOSIS—diagnosisPolicy determines how to notify users of the diagnosis. If it is set to DIAGNOSIS_POPUP, users should be notified with a diagnostic popup window adjacent to the component with the value that violates a constraint; if DIAGNOSIS_STATUS, users should be notified of the diagnosis in a status area; and if DIAGNOSIS_ERROR, users should be notified of the diagnosis in a modal error message window.

VALUE REQUIRED—If valueRequiredPolicy is set to true, then if the field or area has no value it is not valid. The default is false—a value is not required.

CLEAR WHEN DISABLED—If clearDisabledPolicy is set to true, then if the field or area is disabled then its value is removed. The default is false—the value is not removed.

ERROR BORDER—errorBorderPolicy contains the border to display for a text field or text area that is in error. The default is a double-thick red line.

FOCUS BORDER—focusBorderPolicy contains the border to display for a text field or text area when it is in focus if it is not in error. The default is a single-thick blue line.

DISABLED BORDER—disabledBorderPolicy contains the border to display or a text field or text area that is disabled. The default is the same as in the system look and feel.

NORMAL BORDER—normalBorderPolicy contains the border to display for a text field or text area that is not in error, in focus, or disabled. The default is the same as in the system look and feel.

In addition to the foregoing assistance policies, mechanisms are provided for selecting how diagnostic messages are to be displayed, including a pop-up field, which is a tool-tip style pop-up box (this is the default); a status line, which is a wrapping, scrollable message; and a message dialog, which is a standard, modal error message dialog.

All policies apply to all assistance components, but some can be set for each assistance component. Also, some can be combined whereas others are mutually exclusive. For example, instead of choosing between a beep, a diagnosis pop-up, and a special error border, you have all three by default; however, if fixPolicy is true and you enter an error, then the component beeps but no special border appears because the error is fixed immediately. Whether the diagnosis appears could depend on the value of another global policy (diagnoseCorrections), which would be true by default.

Returning to FIG. 5, after the policies are read, they are used to determine the response to the erroneous user input. If the assistance policy is set to fix errors automatically, a fix routine such as a method or utility is called, and the user input is altered to comply with the constraint without further user intervention, as shown in block 512. In one embodiment, an assistance tip with a diagnostic message is still displayed, but does not stick to the assistance component. In another embodiment of the present invention, when the automatic repair option is selected, default variable names are selected. If additional related variable names are required, they are generated as series of input data based on a user-customizable stem (e.g. var0, var1, and var2).

If the FIX ERRORS AUTOMATICALLY assistance policy is not set, the input field border 318 is colored red. If the value of the tipLocationPolicy negative (indicating that no diagnostics are to be displayed), other policies (such as those described above) are recalled and followed, as shown in block 516. If the assistance policy tipLocationPolicy is non-negative (indicating that a diagnostic is desired), the component calls a diagnostic routine such as a utility or method to obtain a diagnostic object having a diagnostic message. An AssistanceTipManager is then called to display 518 the diagnostic message adjacent the input area 316, in accordance with the value of the tipLocationPolicy value. While the diagnostic message is shown attached to the input area 316, it need not be so located. The diagnostic message need only be shown adjacent enough to the input area 316 so that the user can readily relate the diagnostic message with its associated input field 316.

After the diagnostic message has been displayed 518, the user may elect to have the error repaired. This can be accomplished by selecting the arrow 322 in the diagnostic pop-up 320. Logic then proceeds to block 516 where other assistance policies are followed.

In one embodiment, the present invention can also check for input fields for which user input is required. This is accomplished by setting a setRequired flag in the component performing the user-assistance (whether it is a field, area, editable combo or table) to a true logical value. This will cause the component to become invalid when the component has no value.

In some cases, user input but must be checked against other user input to assure that the input value is unique (not pre-existing because it was already entered for another parameter). When a uniqueness check is required, a reference to a Uniqueness Listener module is added to the component. The Uniqueness Listener module is called whenever an input field of the component changes to obtain from the listener a vector of existing strings that can be used to check whether the user input is unique.

Each component supporting the user-assistance functions described above includes a list of diagnosis listeners, which includes the component itself. After the component obtains and displays a diagnosis, if permitted to do so, the component examines the listener list and sends the diagnosis and return code obtained from the validate method to all diagnosis listeners on the list. This feature allows a second component to be notified that the input event violated a constraint, and is particularly useful for input panels with multiple input fields, like the panel shown in FIGS. 3 and 4, since it allows the OK button 324 to be selectively activated based upon whether the user input into any of the input components violates the applicable constraints.

Figure 6:
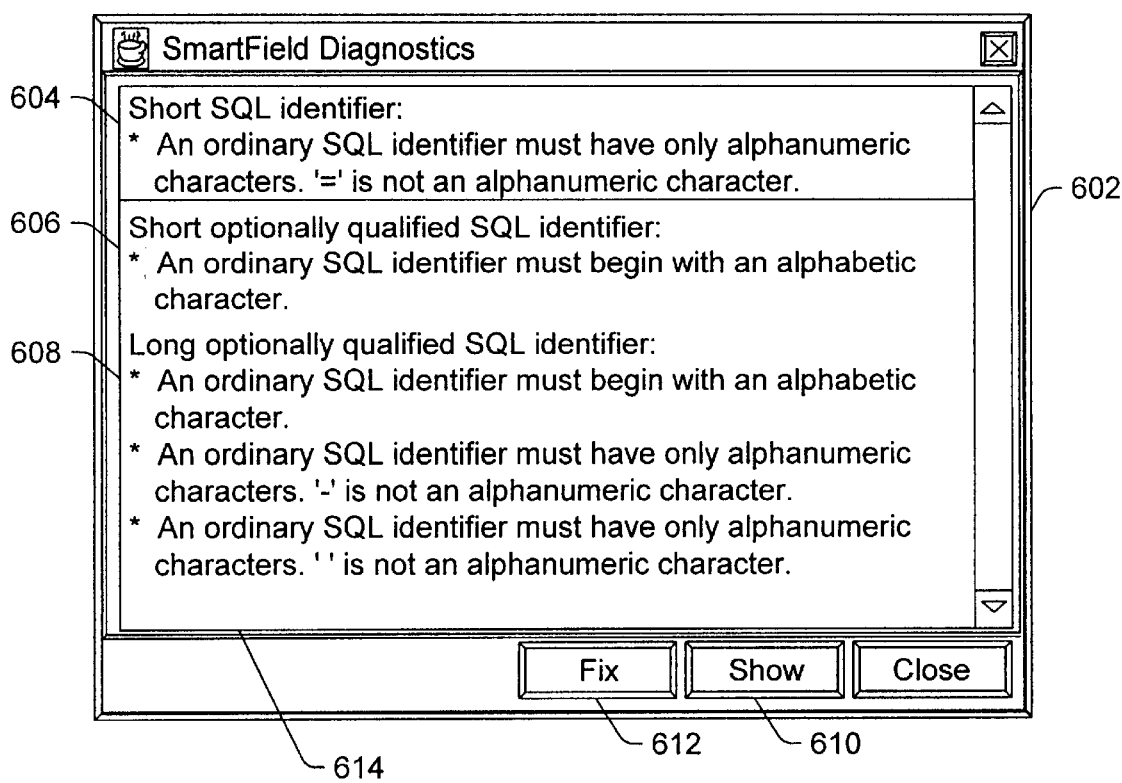
FIG. 6 is an exemplary embodiment of a diagnosis view.

FIG. 6 is an exemplary embodiment of a diagnosis view 602, which presents all open constraint violations. This GUI is presented to the user when the user would prefer to defer presentation of diagnostics until all of the input data has been entered. This may be the case, for example, when the user is creating a "batch" process such as code generation or project validation, which often results in the discovery of multiple constraint violations. In the illustrated embodiment, the diagnosis view 602 includes diagnoses for three components (short SQL identifier 604, short optionally qualified SQL identifier 606, and long optionally qualified SQL identifier 608. These component labels described the type of the component values for purposes of demonstration; actual labels would describe the purposes of the components such as "Table name" or "Parameter name." A diagnosis for the constraint violation is indicated under each of the diagnosis categories. Selecting the diagnosis and then the show button 610 brings up the window containing the field in error (such as first window 302), and displays the diagnosis as a smart tip. Selection of the diagnosis and the fix button 614 fixes the constraint violation.

Figure 7:
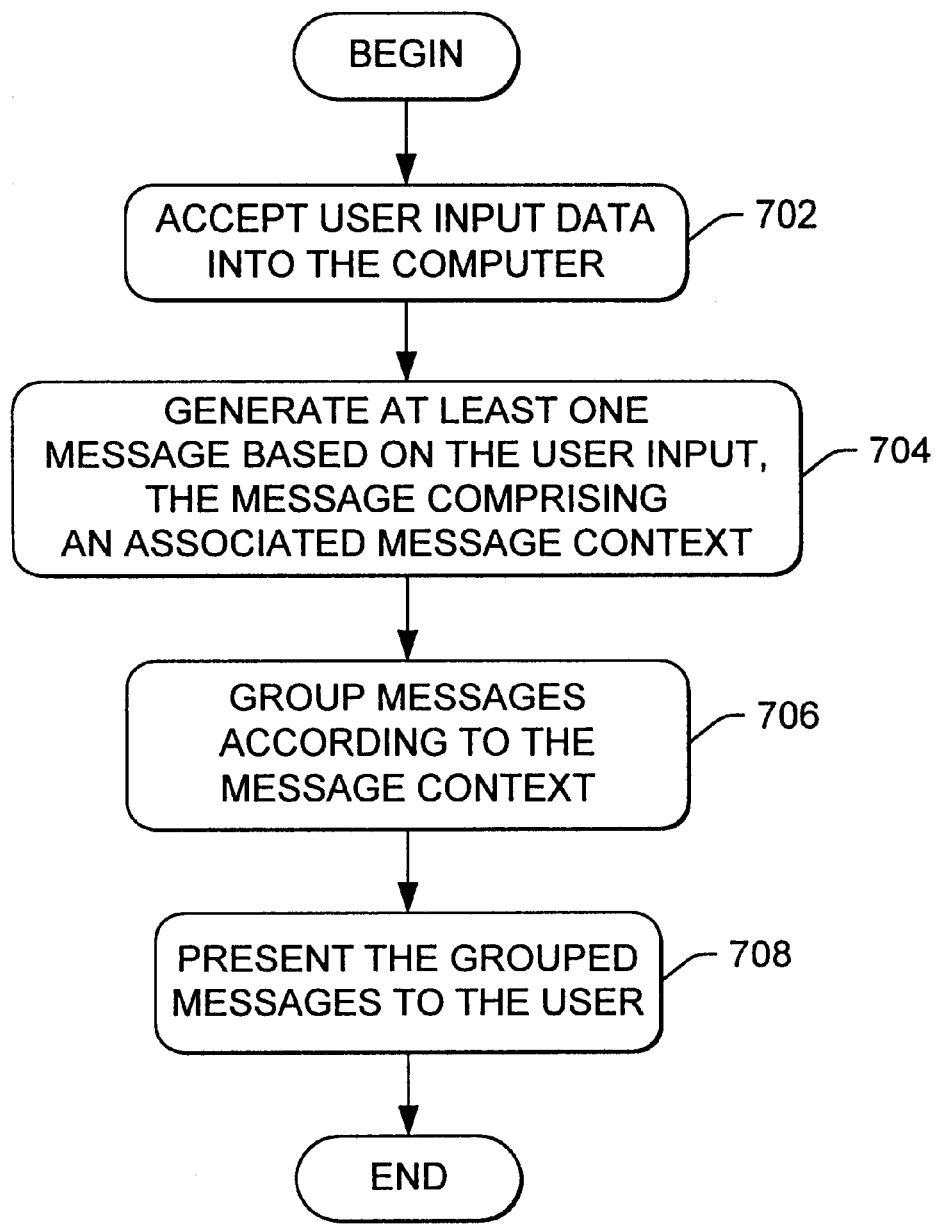
FIG. 7 is a flow chart presenting exemplary process steps for presenting the diagnosis view shown in FIG. 6.

FIG. 7 is a flow chart presenting an exemplary process steps in presenting the diagnosis view shown in FIG. 6. A message is then generated 704 based on the user input. The message comprises an associated message context. Messages are then grouped 706 according to the message context, and presented 708 to the user. In one embodiment, the grouped messages are presented to the user in the diagnostic box 602 in a text viewing area 614, and the diagnostic messages are line wrapped. This allows the user to view the entire diagnostic message, from beginning to end, without horizontal scrolling.

A message manager can manage the display of messages in the diagnosis view. After receiving the diagnosis objects from the components in error, the manager checks to determine if a diagnosis message is already being displayed somewhere else. If so, the diagnostic message is hidden. If no diagnosis messages are being displayed elsewhere, a diagnosis pop-up is created to represent the diagnostic object to the user. The object is asked for a formattable character string, which includes, in one embodiment, tags for an HTML document containing an unordered list. The manager determines the size of the diagnostic display window, and adds bullets and other formatting as required to display the diagnostic message according to the diagnosis tags. These tags may describe any textual structure, including specification for font styles, sizes, colors, margins, or graphical elements such as bullets, lines, arrows, or boxes, resulting in, for example, an ordered list, an unordered list, a definition list, or a table with rows and columns. When the message manager encounters the list item tag, a method determines the size of the diagnostic display window, adds bullets and other formatting as required to display the diagnostic message.

Figure 8A:
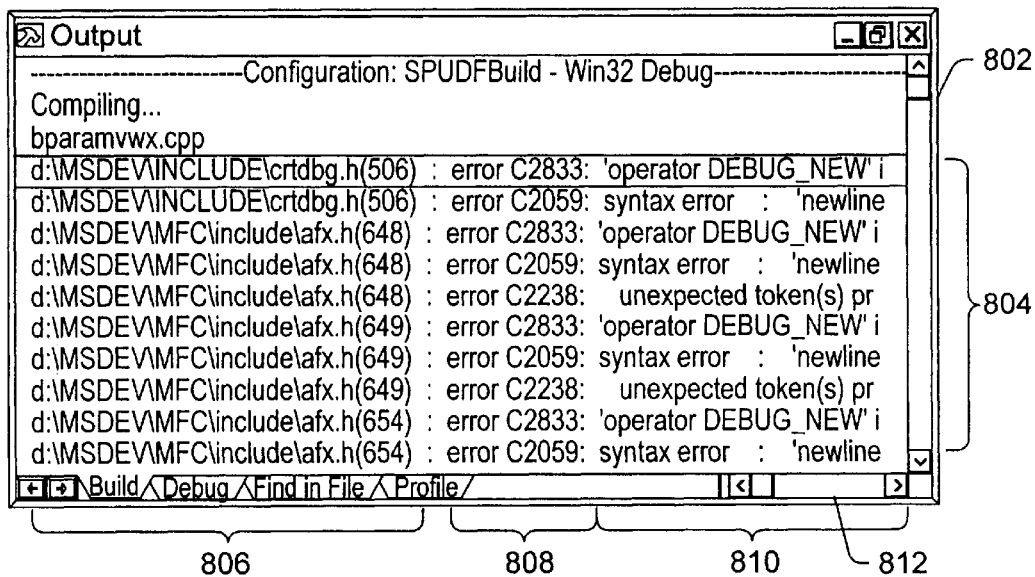
FIGS. 8A–8D present examples of message views before and after application of one embodiment of the present invention.

FIG. 8A presents an example of a view before application of one embodiment of the present invention. The view comprises an output window 802 having a plurality of messages 804. In the illustrated view, the messages are error messages. Each message 804 includes context information such as error source identification information 806, error code 808, and an error description 810. The error messages 804 are difficult to read because have not been line wrapped or grouped according to the error context. Hence, the user must use the horizontal scroll bar 812 to view the messages.

Figure 8B:
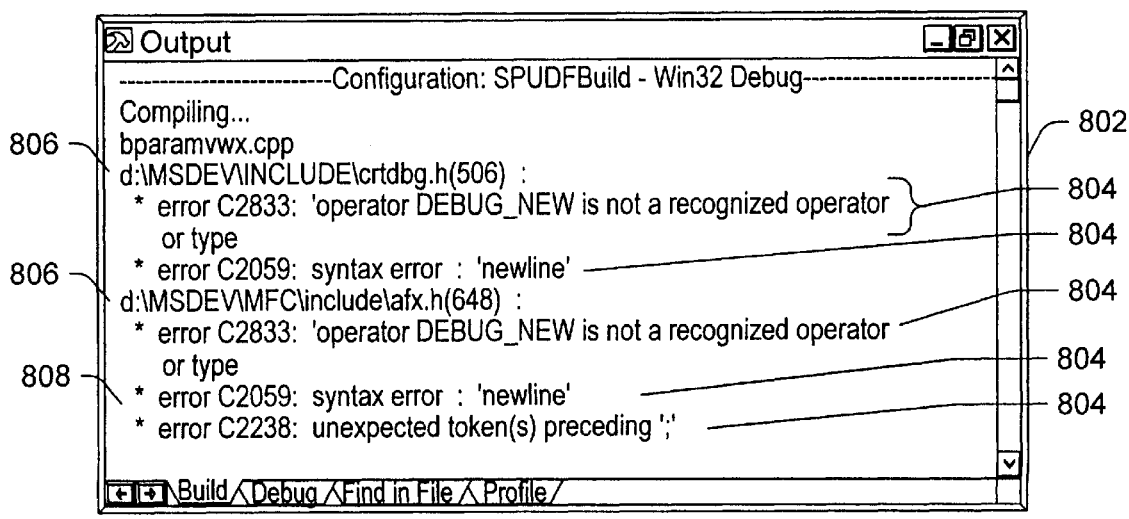

FIG. 8B presents an example of a view after application of the present invention. Note that the error messages 804 are now line-wrapped so that the entire message may be viewed without resort to a horizontal scroll bar, and that the messages have been grouped according to the error source identification information 806. The messages may have been grouped according to other context information, for example, by error number (i.e. grouping all syntax errors together) if desired.

Figure 8C:
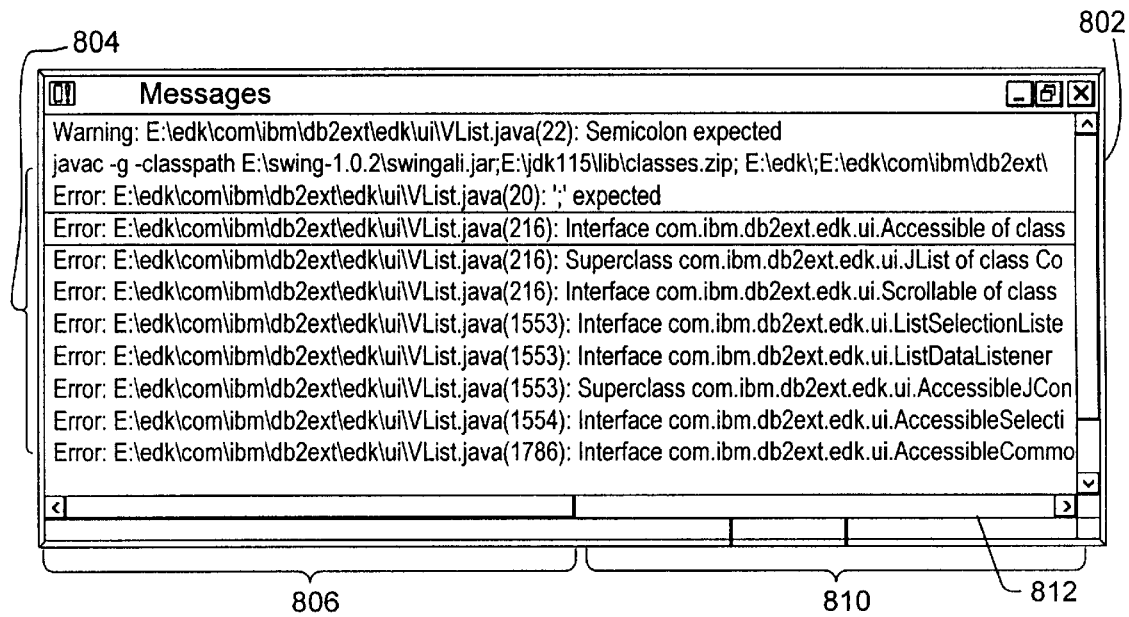

FIG. 8C presents another example of a view before application of the present invention. The view comprises an output window having a plurality of messages 804 displayed therein, each of which includes context information such as error source information 806 and an error description 810. As in the example illustrated in FIG. 8A, the error messages are not organized, and a horizontal scroll bar 812 must be used to view the entire message.

Figure 8D:
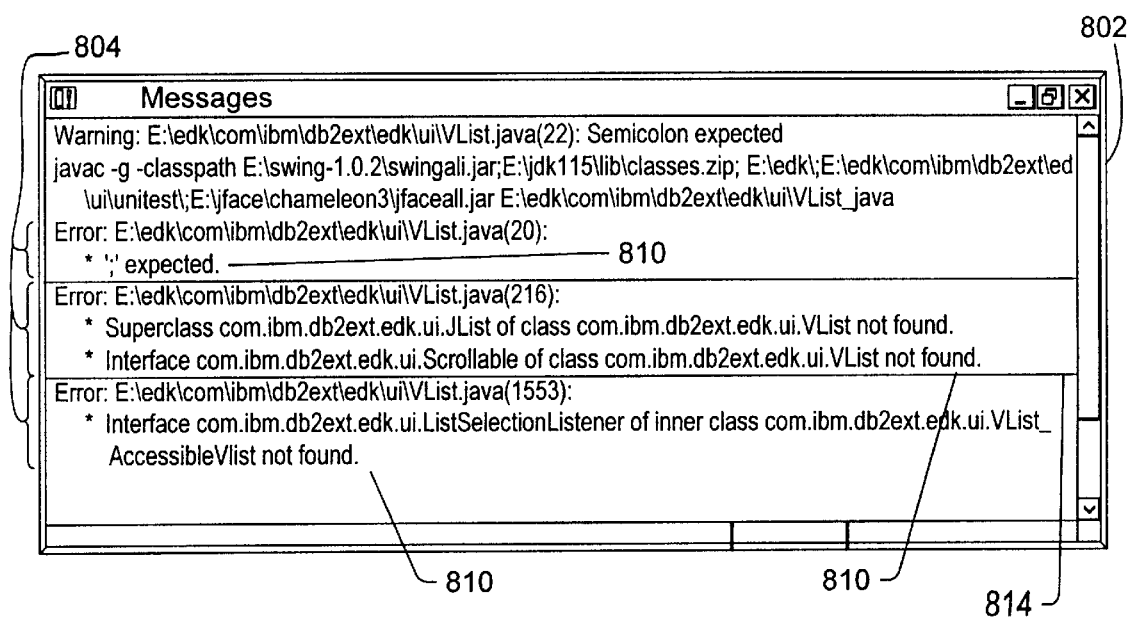

FIG. 8D presents an example of a view of the information presented in FIG. 8C, but after application of the present invention. Error messages 804 have been line wrapped and grouped according to the error source identification information 806, obviating the need for a horizontal scroll bar, and making the error messages much easier to read.

Three State Enablement

Three-state enablement assistance components gives the user added information about uneditable components. This extra information can be valuable, because there are situations where the value is significant, but not editable, and situations where the value is neither significant nor editable. Showing the value when it is not significant can be confusing to the user, because the user doesn't automatically know what is significant.

Figure 9:
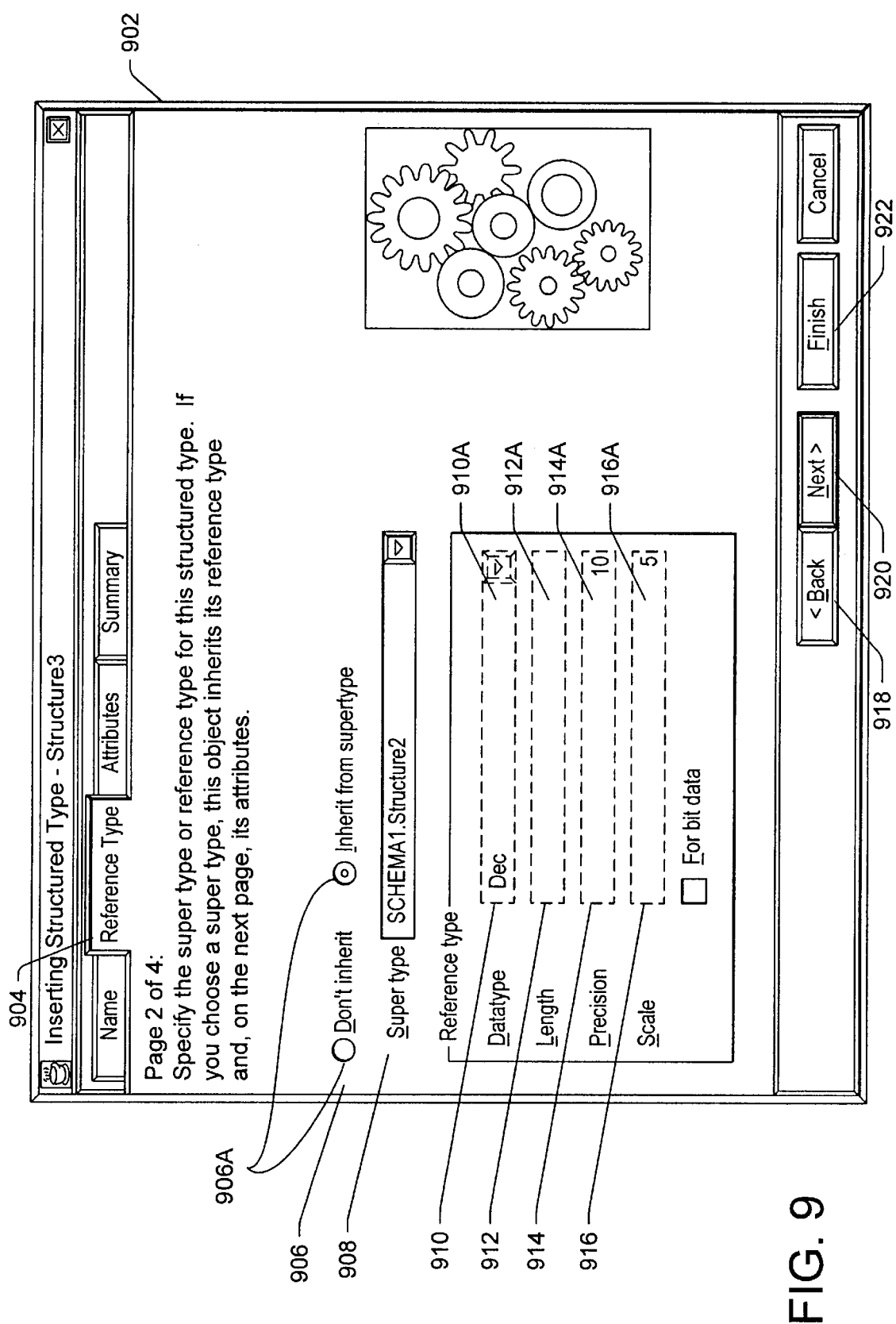
FIG. 9 presents an illustrative example of the three component enablement states.

FIG. 9 shows an illustrative example of the value of the three enablement states, including the enabled with a value state, disabled with a value state, and disabled without a value state. A component is designated as a three enablement state component by setting a clearDisabled flag to a logical true value.

A structured data type dialog box 902 comprises a plurality of tabs, one of which is a reference type tab 904. The user may decide to insert a structured type that is inherited from a super type or not, and makes this selection via the inheritance radio buttons 906. If the user elects to insert a structured type that is inherited from a super type, the super type is indicated or entered into the super type drop box 908.

For an SQL inherited reference type in an SQL structured type, both noneditable states (significant and editable and significant and non editable) must be used. Length is not significant for an decimal type; precision and scale are significant. Nevertheless, a user cannot edit an inherited reference type, so all fields (the datatype field drop down box 910 (also known as a combo box), length field 912, precision field 914, and the scale field 916 are disabled. The user can enter the data indicated by the inheritance radio buttons 906 and the super type drop box 908 by selecting the finish button 922. The next button 920 allows the user move to the next page. The back button 918 moves to the previous page (the user can also jump to any page by selecting a tab for the page).

The user may choose not to inherit from the super type (by selecting the "don't inherit") radio button 906. In this case, the data type drop-down box 810 is enabled and editable, and the length field 912, precision field 914, and the scale field 916 are enabled and editable, depending on whether they are relevant to the data type selected in the drop-down box 910.

Figure 10:
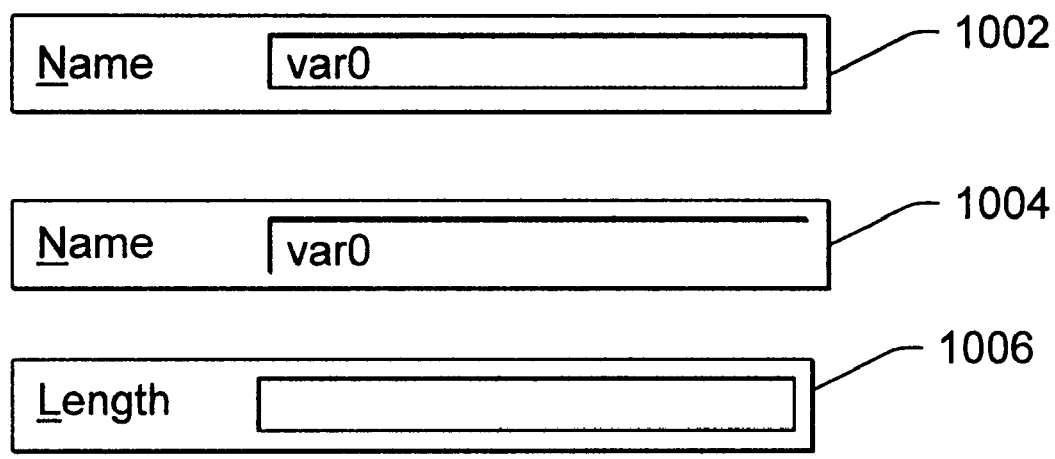
FIG. 10 is a diagram showing how field components are displayed as being enabled, disabled with a value, and disabled without a value.

FIG. 10 is a diagram showing how field components are displayed as being enabled, disabled with a value, and disabled without a value. The enabled state is indicated with the title of the field in normal text, and a clear input area, as shown by the enabled component 1002. The disabled with value state is indicated with the title of the field in normal text, but with a grayed input area, as shown by the disabled component 1004. The disabled without value state is indicated with the title of the field in grayed text, and with no value indicated in the input area, as shown by the disabled with no value component 1006.

Figure 11A:
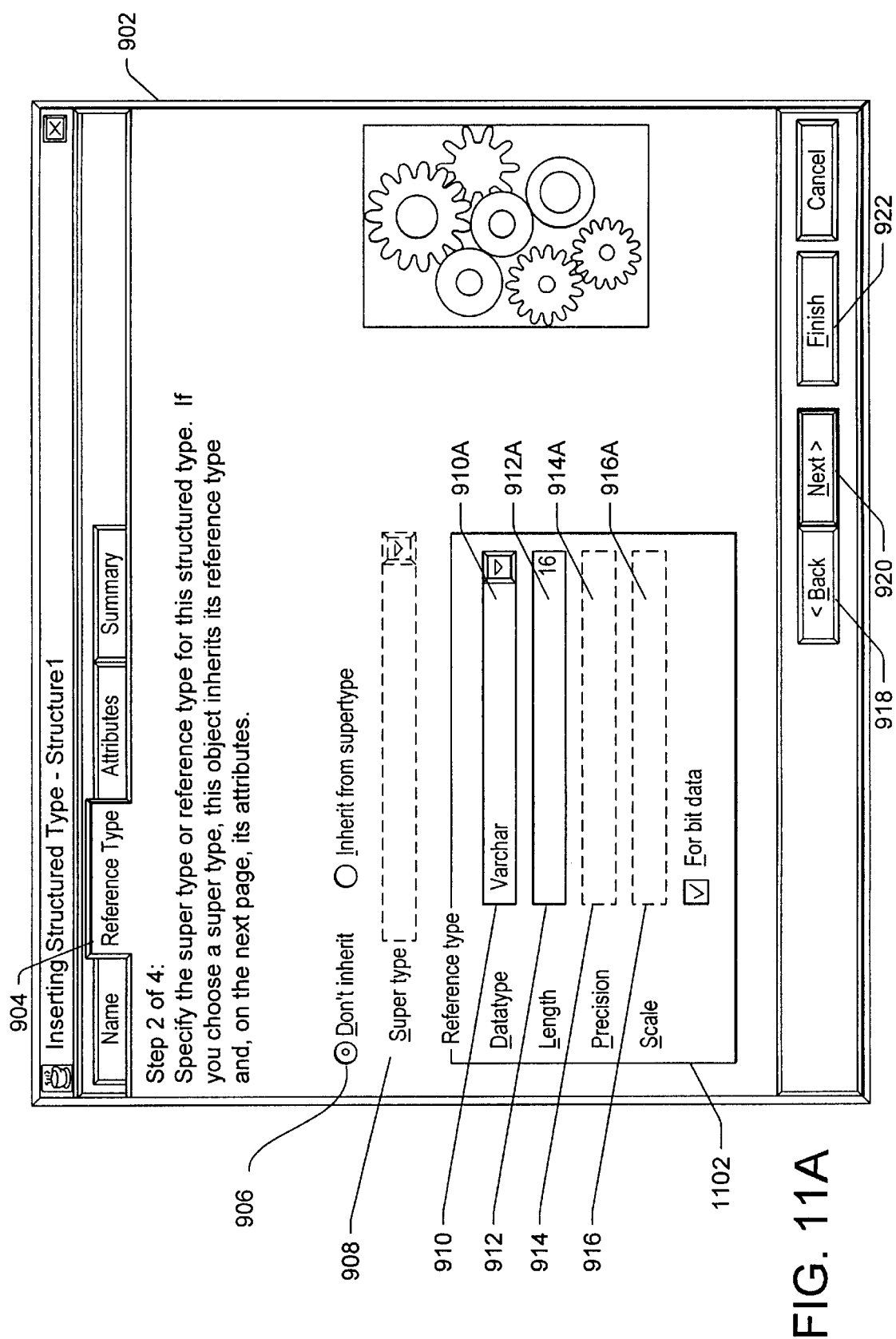
FIGS. 11A and 11B are diagrams showing how field components are displayed as being enabled, disabled with a value, and disabled without a value.

FIG. 11A presents another example of the use of three state enablement. In this example, the "Don't Inherit" radio button 806 option was selected. This disables the super type drop box 908 and activates the reference type input area 1102. Because the selected datatype is "Varchar," the datatype field drop down box 910, and the length field 912 are activated, and the precision field 914 and scale field 916 are disabled.

Figure 11B:
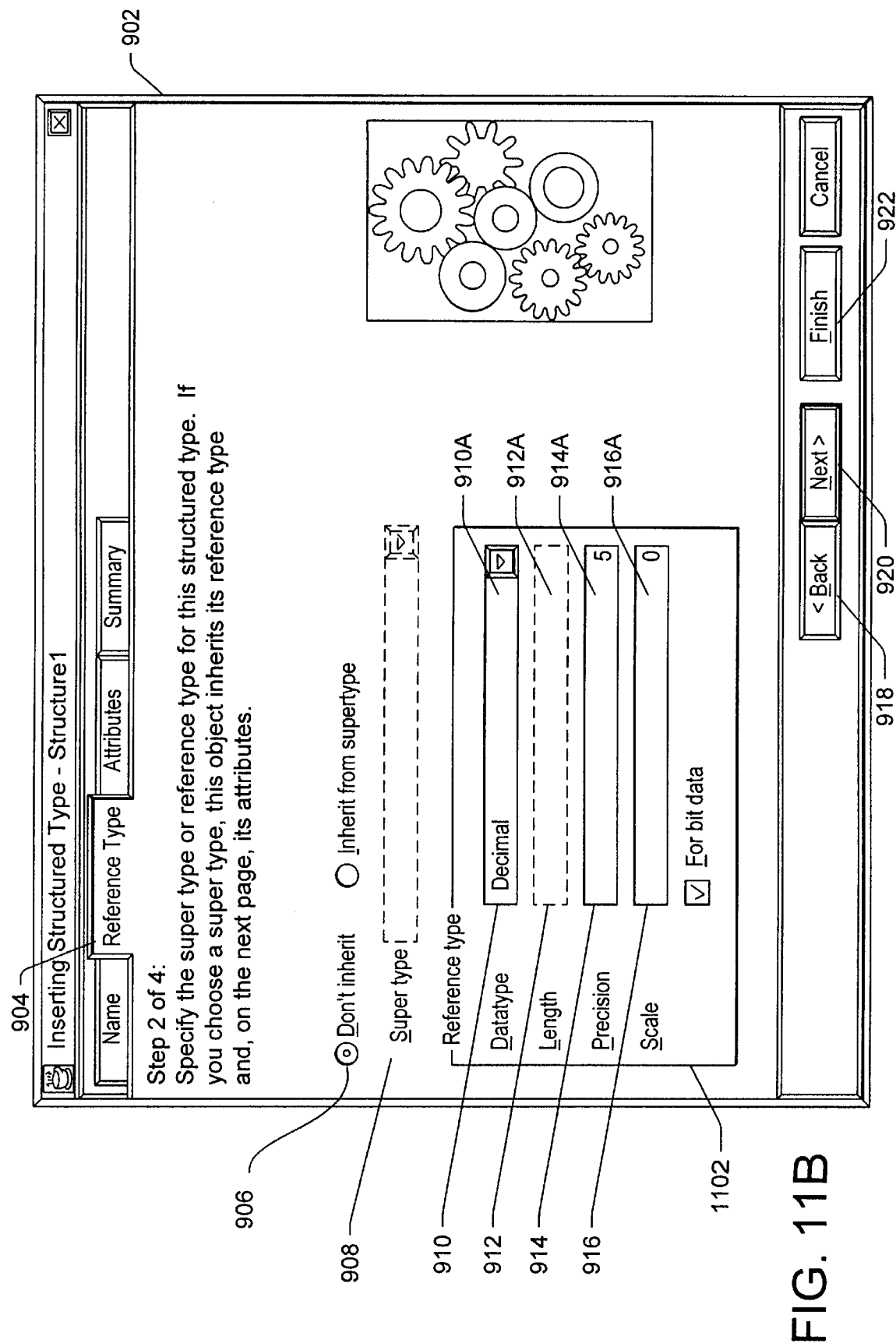

FIG. 11B presents still another example of the use of three state enablement. In this example, the "Don't Inherit" radio button 806 was again selected, but because the selected datatype is "Decimal" the length field 912 is disabled, and the precision field 914 and the scale field 916 is activated.

Tables

Columns of tables can be edited with assistance components configured for various content types (such as SQL_LONG_IDENTIFIER for names of SQL objects).

Figure 12A:
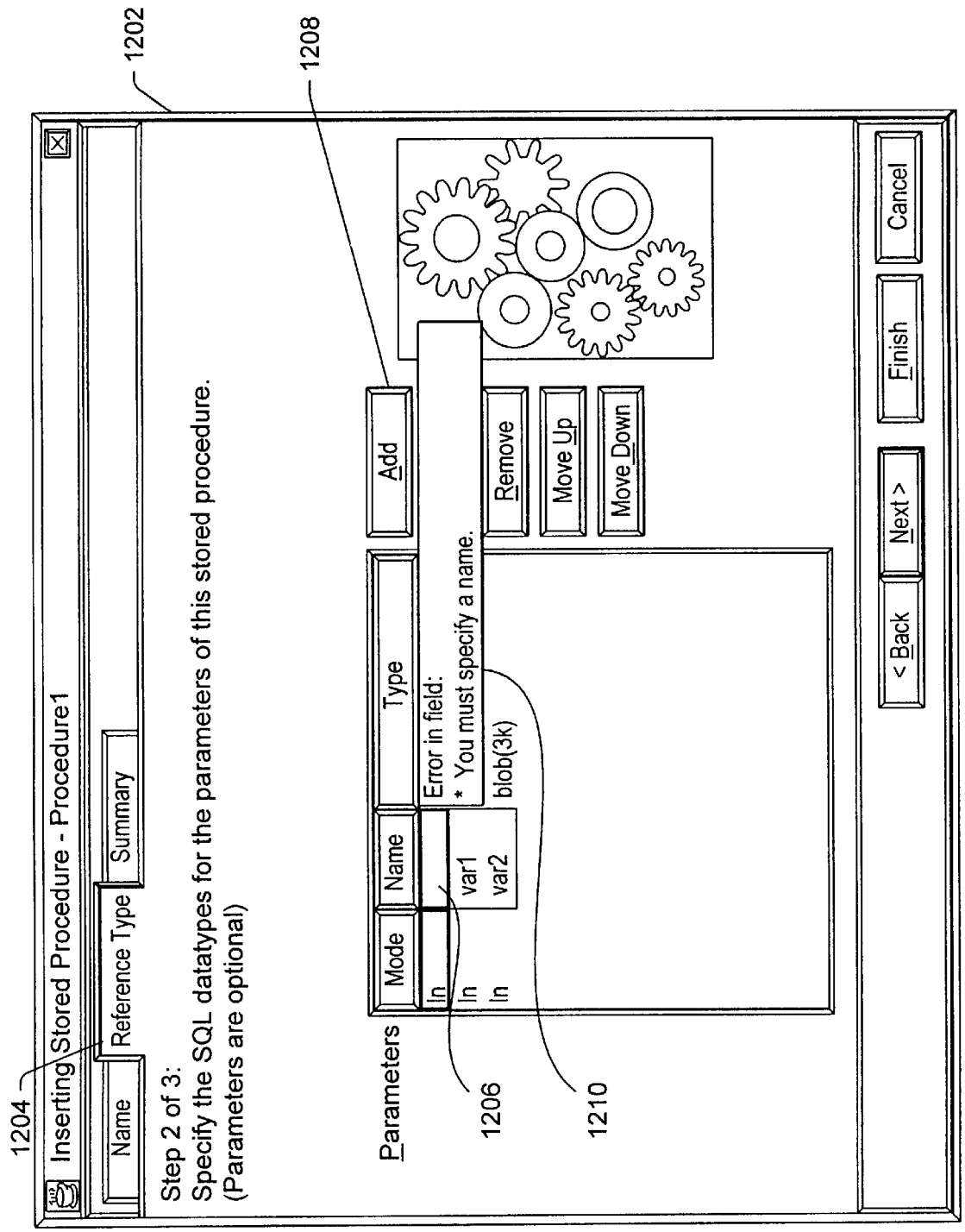
FIGS. 12A and 12B are diagrams presenting an application of the assistance components for use in tables.

FIG. 12A presents an example of the editing of tables. Here, the user is using a stored procedure parameter definition window 1202 to specify SQL datatypes for the parameters for a stored procedures. Here, the user has attempted to define a field with no name, by inputting no entry into the name field 1206 and selecting the add button 1208. Because the parameter must be given a name and the assistance policy associated with this component specifies that the user be given an error message for failing to enter a name before depressing the add button 1208, an error message is presented in area 1210.

Figure 12B:
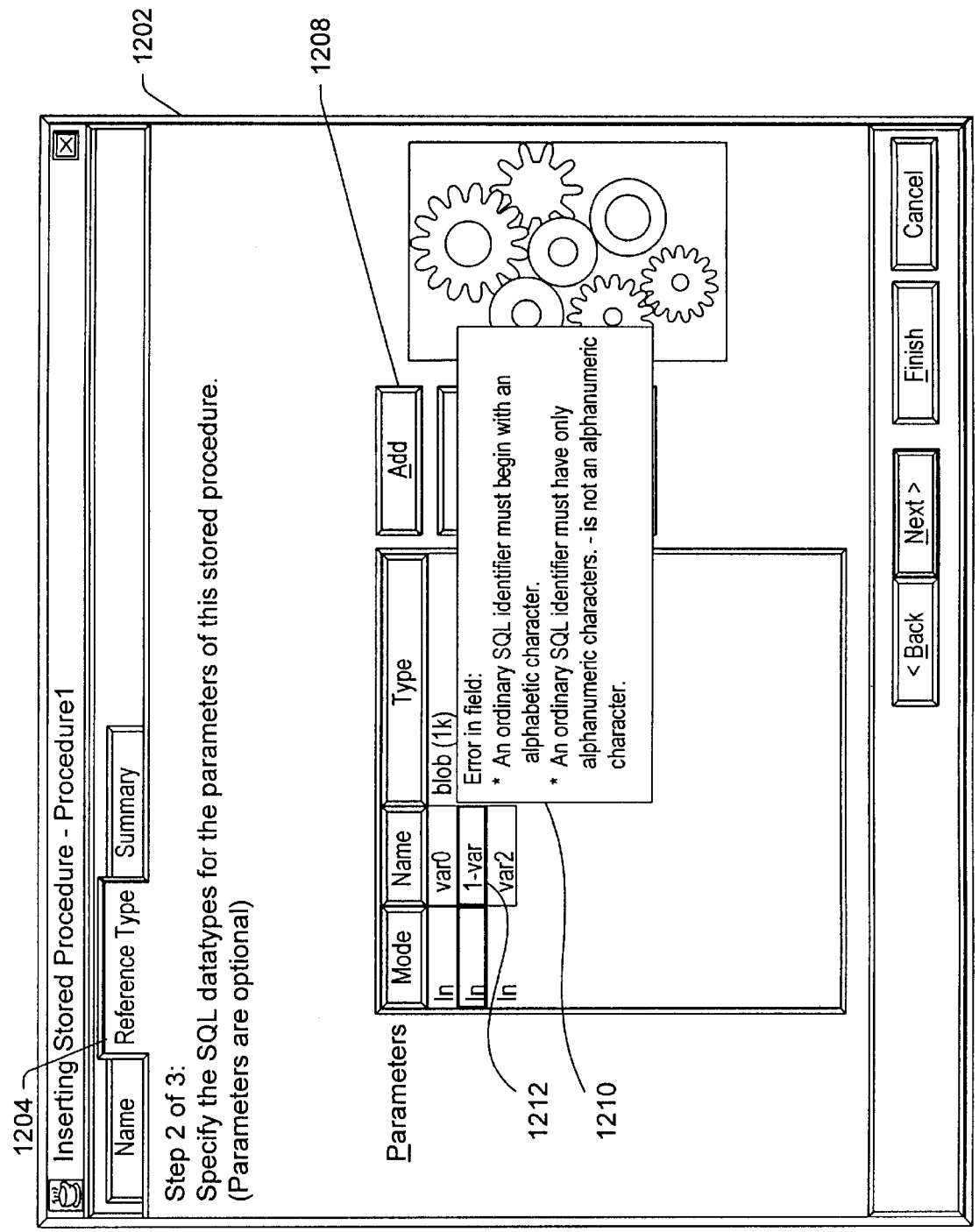

FIG. 12B presents another example of the editing of tables. Here, the user has attempted to enter the name "1-var" for the variable name in table field 1212. Since SQL identifiers must ordinarily begin with an alphabetic character and cannot include a "-" character, two error messages are presented in area 1210.

Dependent Components

As described in the foregoing, the present invention allows the presentation of single dialog with multiple components and the independent diagnosis of the user input into each component according to independent input constraints and assistance policies. This capability provides the software developer with a great deal of flexibility in determining how and when user input errors are detected, diagnosed, and repaired. The present invention also allows the constraint applied to one of the components in the dialog or series of components to be dependent upon the user data input to one or more of the other components.

Figure 13:
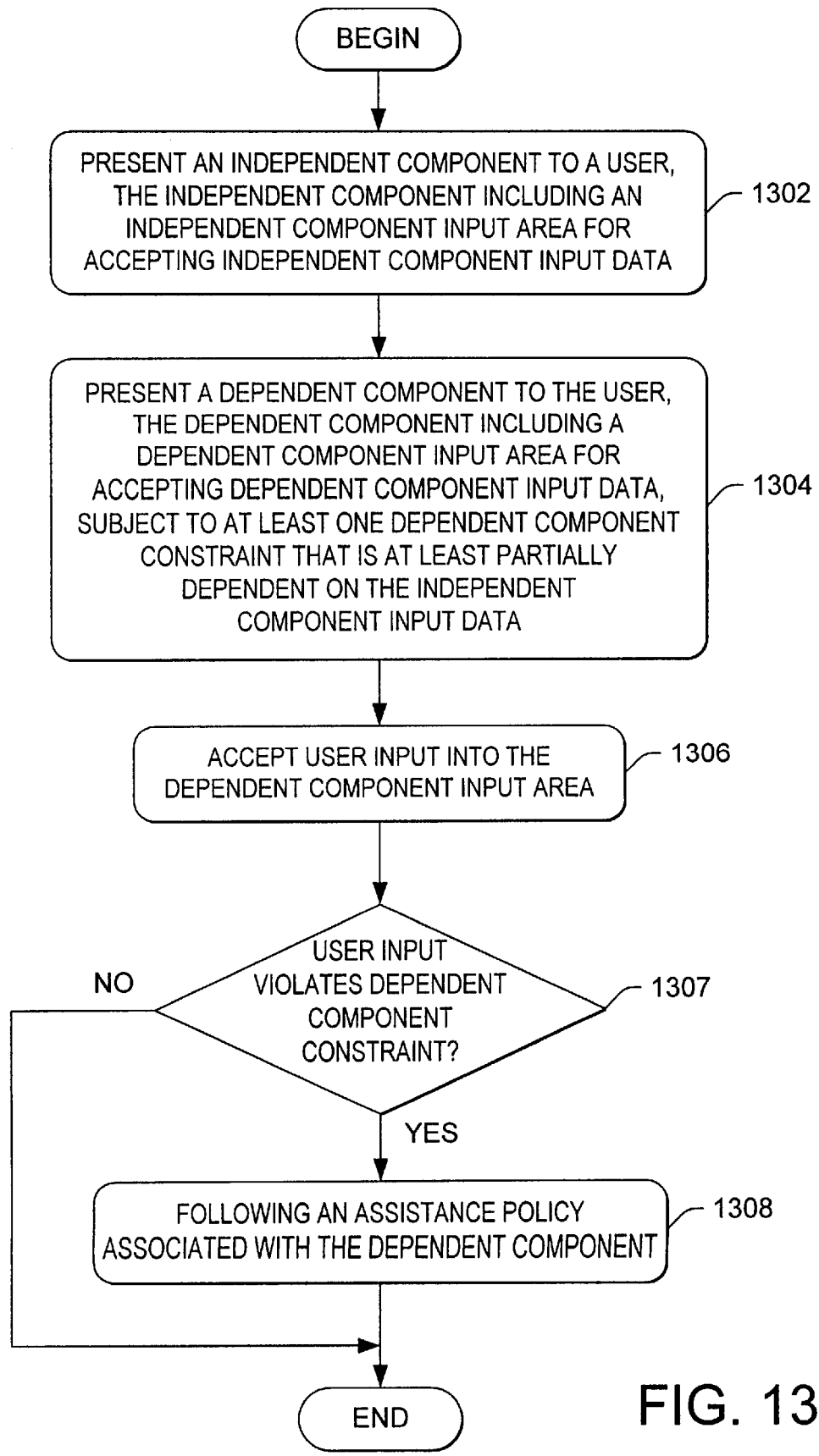
FIG. 13 is a flow chart showing exemplary process steps for accepting data in a component whose input constraint depends on the user input for another component.

FIG. 13 is a flow chart showing exemplary process steps for accepting data in a component whose input constraint depends on the user input for another component. The discussion below will also refer to elements in FIG. 9, which presents an example of a user interface in which the constraints that are followed for one component are at least partially determined from the user input into another one of the components.

First, as shown in block 1302 of FIG. 13, an independent component is presented 1302 to the user. The independent component presents an independent component input area to the user that accepts independent component input data via keyboard strokes or other input techniques. In the exemplary embodiment of FIG. 9, the independent component is represented by radio buttons 906 with input area 906A. In other embodiments, the independent component may be represented by a drop box, a simple input field, or any other component accepting user input. Subsequent to or simultaneous with the presentation of the independent component, a dependent component is also presented to the user as depicted in block 1304. The dependent component (which may be represented by the data type field 910, length field 912, precision field 914, and the scale field 916) includes a dependent component input area (such as input areas 910A, 912A, 914A, and 916A, respectively) for accepting dependent component input data from the user. Further, the dependent component is subject to a dependent component constraint that is at least partially dependent upon the data that the user input into the independent component input area of the independent component. If desired, the independent component may be subject to a independent input constraint. Further, the dependent component may be subject to two constraints: the constraint imposed by the user input from the independent component, and an independent input constraint.

User input is then accepted into the dependent component input area, as shown in block 1306. Block 1308 checks to determine if the user input into the dependent component violates the dependent component constraint. This can be accomplished by calling a validate routine such as a method or utility from the dependent component. If the user input violates the dependent component constraint, an assistance policy associated with the dependent component is followed, as shown in block 1308. In one embodiment, this is accomplished by calling a diagnostic routine such as a utility or method from the dependent component in accordance with an assistance policy.

In one embodiment, the dependency between the user input into the independent component and the dependent component constraint is implemented using the same techniques described above with respect to the use of multiple input components on a single input panel. In this case, the input data or other data required to communicate the dependency between the data input to the independent component and the constraint applied to the dependent component is transmitted from the independent component to all components listed on a diagnosis listener list maintained by the independent component. In another embodiment, the dependency is communicated via a registry accessible to all components. Alternatively, the dependency can be implemented by defining special methods and constructors can be used in the components to assign the input field of the dependent component as an attribute of a class.

Figure 14:
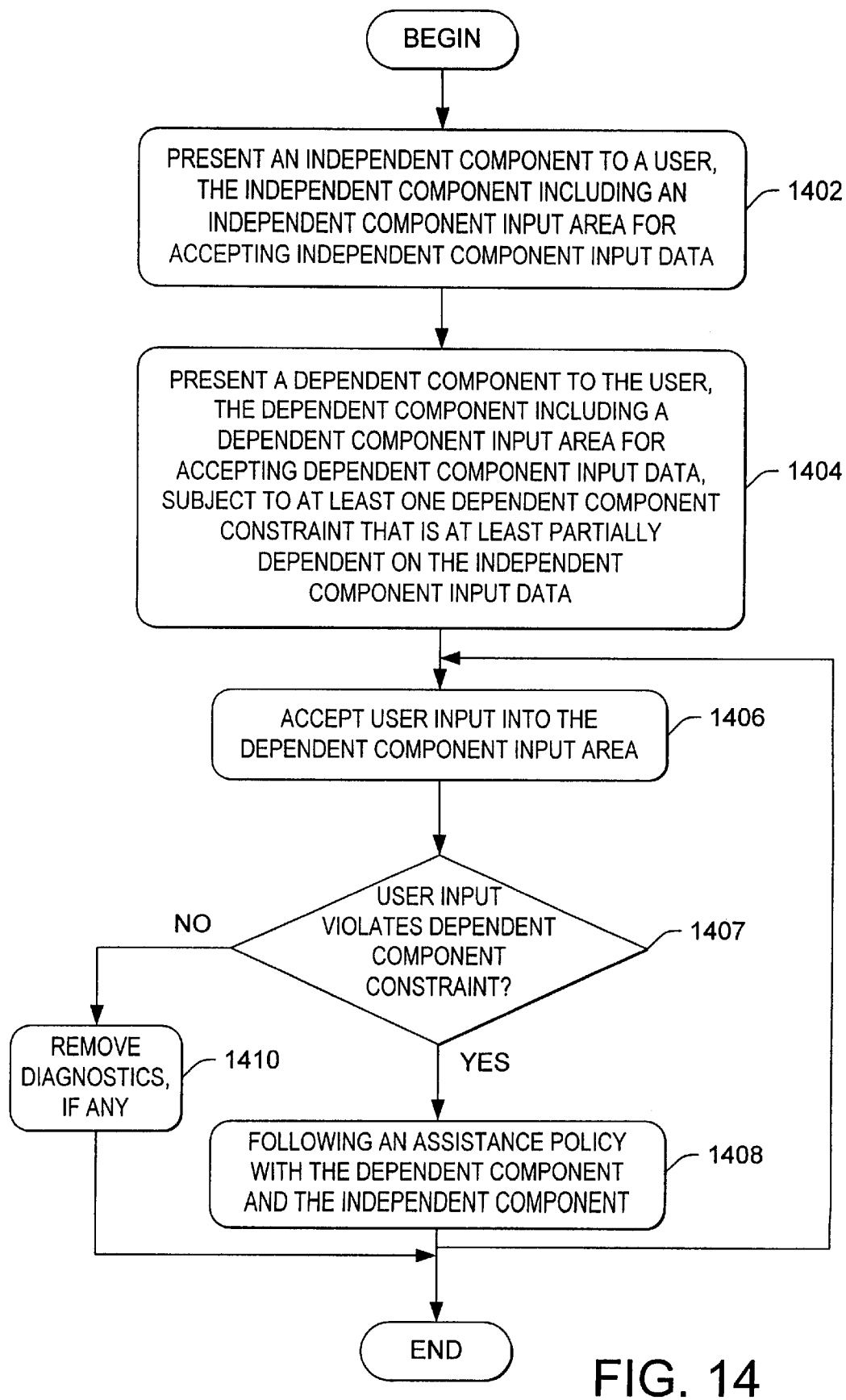
FIG. 14 is a flow chart showing exemplary process steps for accepting data in an independent component when input constraints for a dependent component depend at least partially on the data input to the independent component.

FIG. 14 is a flow chart showing exemplary process steps for accepting data in an independent component when input constraints for a dependent component depend at least partially upon the data input into the independent component. In this case, the change in the input to the independent component input data cases the input into the dependent component (which previously complied with the dependent component constraint) to become non-compliant. First, the independent and dependent components are presented to the user, as shown in blocks 1402 and 1404 and discussed in further detail with respect to FIG. 13. Then, user input is accepted into the independent component input area, as shown in block 1406. If the user input violates the dependent component constraint (which has changed, by virtue of its dependence on the value in the independent component input area), an assistance policy is followed 1408. In one embodiment, the only the assistance policy associated with the dependent component is followed. In another embodiment, an assistance policy associated with the independent component is followed. If necessary, the policy invoked may inform the user that other components are dependent on the independent component, thus allowing the user to reconsider the change. In another embodiment, an assistance policy with both the dependent and the independent component are followed, thus allowing the user to determine for themselves which of the two components should be changed to bring both into compliance with both constraints.

If the user desires, further input to the independent component input area can be accepted, as shown in the logical loop back to block 1406, and this further user input is also examined to determine if it causes a constraint violation in the dependent component. When the user input to the independent component input area does not result in a violation of either component's constraints, block 1410 removes the previously presented independent and dependent component diagnostics, since they no longer apply to the current input values.

Figure 15:
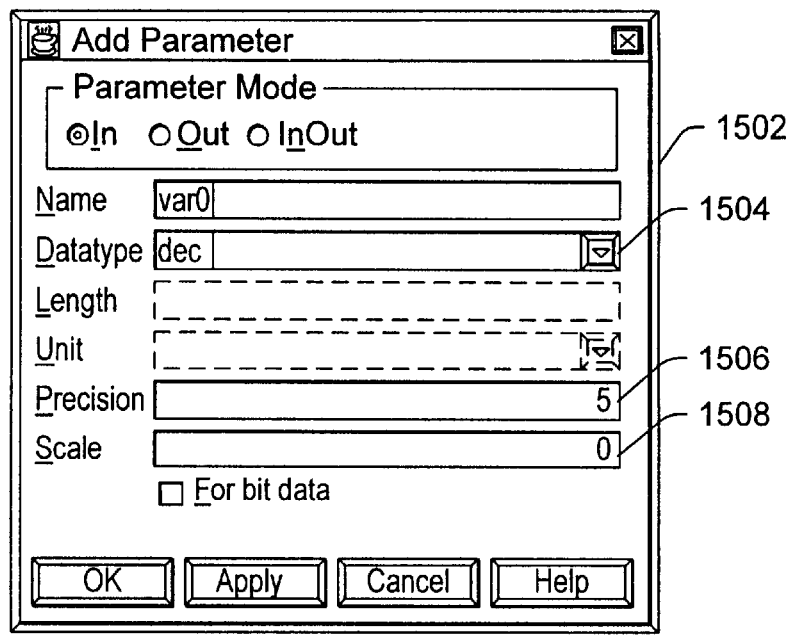
FIG. 15 is a diagram illustrating the application of independent and dependent component constraints.

FIG. 15 is a diagram illustrating the application of the foregoing with independent and dependent component constraints. Here, in an Add Parameter window 1502, the user has specified an input variable named "var0" of a decimal datatype. The user has also specified the parameter variable as a decimal type by the appropriate input into datatype field drop down box 1504. The "precision" of a datatype is the maximum number of significant digits in a decimal number. The "scale" is the number of digits to the right of the decimal point. In DB2, a decimal number has a minimum precision of "1" and a maximum precision of 31. The minimum "scale" is "0" and the maximum scale is the precision value. The default precision is "5" and the default "scale is "0", so those values are written into the precision field 1506 and the scale field 1508. Since there is no constraint violation, no error message is displayed.

Figure 16:
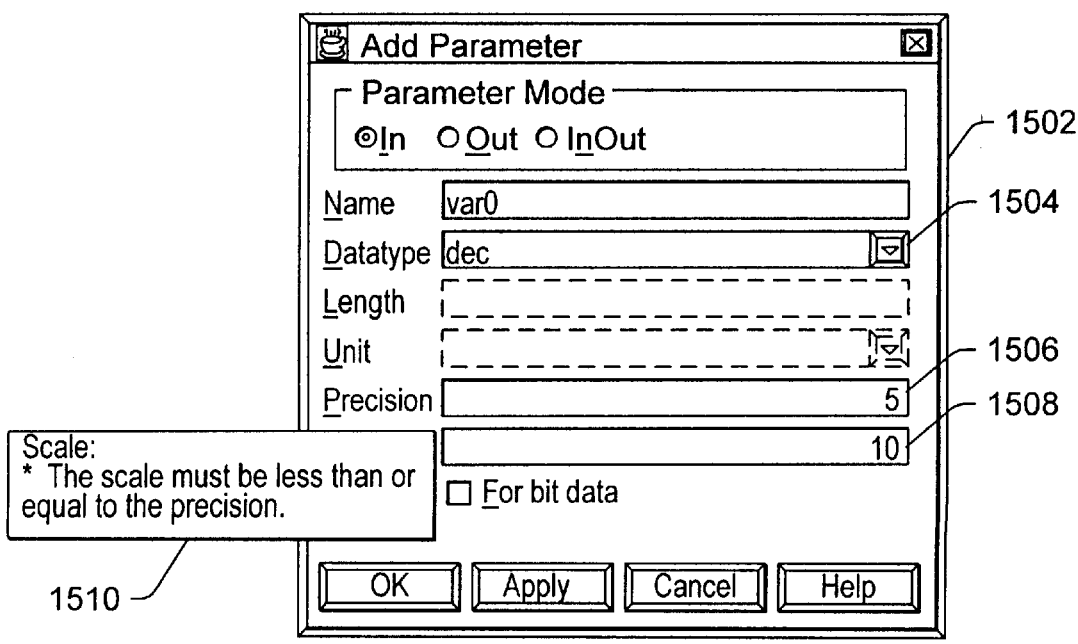
FIG. 16 is a diagram illustrating a further example of the view presented in FIG. 15.

FIG. 16 presents the Add Parameter window 1502 of FIG. 15 after the user attempts to change the "scale" value to "10." Since the scale has a constraint that is dependent on the entry into the "precision" field (i.e., it must be less than or equal to the "precision" value), an assistance policy associated with the dependent field (here, the scale field 1508 is followed, and the appropriate error message is displayed in the error message box.

Figure 17:
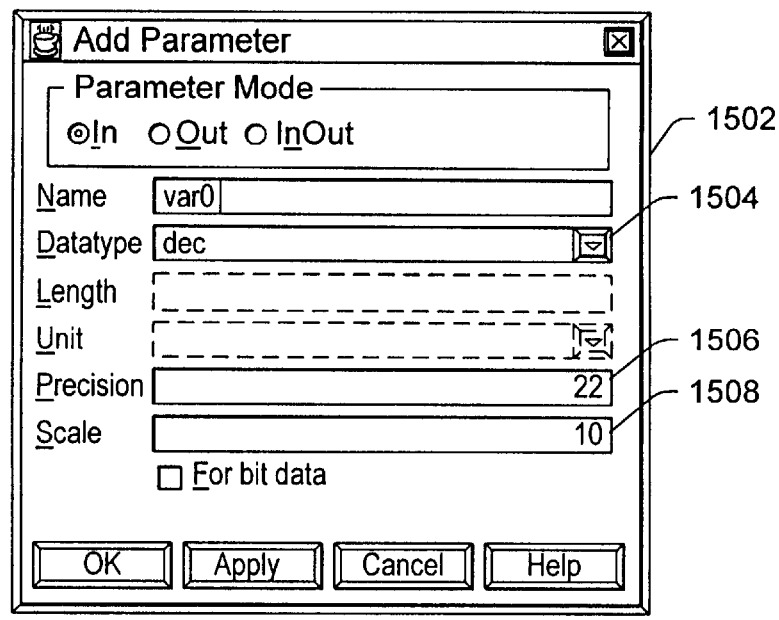
FIG. 17 is a diagram presenting another illustrative example of the application of independent and dependent components.

FIG. 17 presents the Add Parameter window 1502 after the user has entered a "22" for the precision value in the precision field 1506, and a "10" for the scale value in the scale field 916. Because no constraints are violated for these inputs, no error message is displayed.

Figure 18:
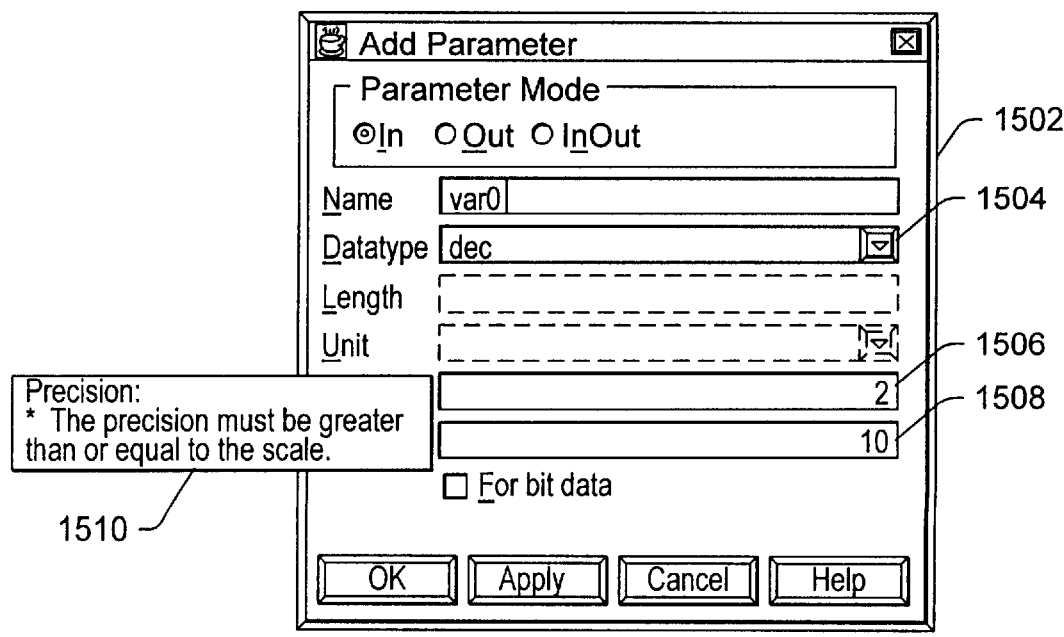
FIG. 18 is a diagram illustrating a further example of the view presented in FIG. 17.

FIG. 18 presents the Add Parameter window 1502 of FIG. 17 after the user has entered a "2" for the precision in the precision field. Because the precision must be greater to or equal to the scale, an error message box 1510 is displayed. Because the precision field 1506 is currently in focus, the error message box 1510 is displayed adjacent to the precision field 1506.

Figure 19:
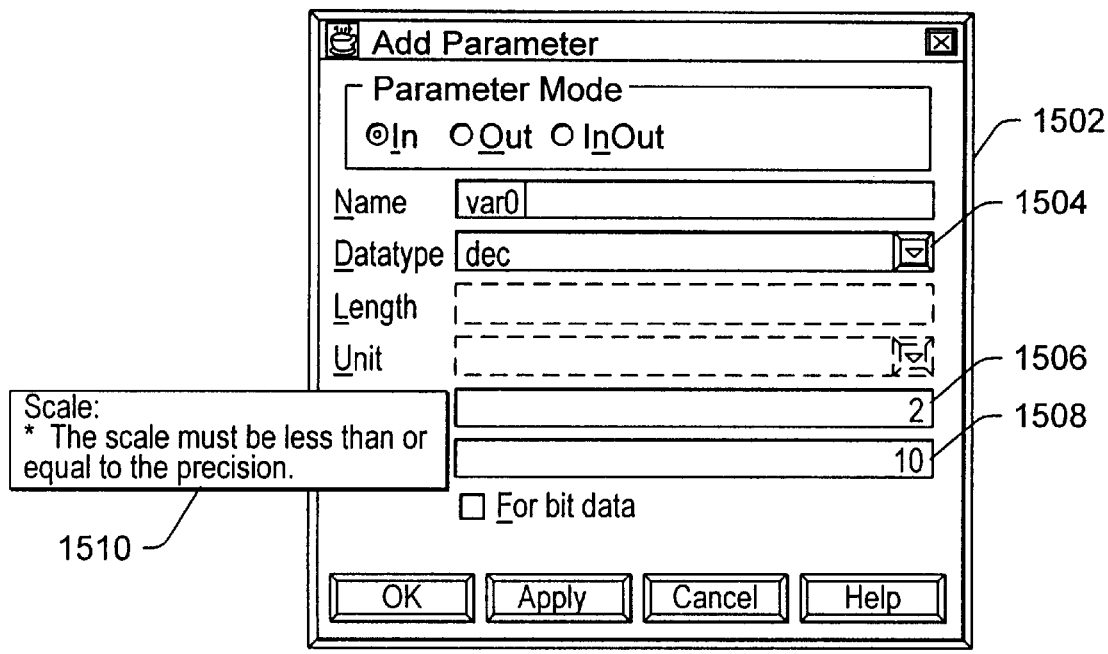
FIG. 19 is a diagram showing a further example of the view presented in FIG. 17, wherein the user has changed focus from the independent control to the dependent control.

FIG. 19 presents the Add Parameter window 1502 of FIG. 18 after the focus has been changed to the scale field 1508. The change in focus presents an error message in the error message box 1510 indicating that the scale must be less than or equal to the precision. If desired, the error messages depicted in FIG. 18 can be deployed simultaneously with that of FIG. 19.

Conclusion

This concludes the description of the preferred embodiments of the present invention. In summary, the present invention describes a method, apparatus, and article of manufacture for accepting data input into a computer.

The method comprises the steps of presenting a component to the user, wherein the component includes an input area for accepting the input data, and the component is subject to a constraint for the data, accepting user input into the component input area, and enforcing an assistance policy associated with the component when the user input violates the value constraint. In one embodiment, the value constraint for the input data is organized according to the component content type. In another embodiment, the method comprises the steps of defining a component comprising an input area for accepting input data, associating the component with a value constraint according to a content type of the input area, and associating the component with an assistance policy selected from a set of assistance policies. The article of manufacture comprises a program storage device tangibly embodying instructions for performing the method steps defined above.

The apparatus comprises a means for presenting a component including an input area for accepting user input to the user, wherein the component is subject to a constraint for the input data according to component content type, means for accepting user input into the component input area, and means for following an assistance policy associated with the component when the user input violates the value constraint.

The foregoing description of the preferred embodiment of the invention has been presented for the purposes of illustration and description. It is not intended to be exhaustive or to limit the invention to the precise form disclosed. Many modifications and variations are possible in light of the above teaching. For example, while the foregoing discussion discloses the application of the present invention to the defining SQL variables and parameters, the invention is not limited to SQL alone, and can be applied to other programming languages such as PL/I, C, C++, FORTRAN, and input for any computer program such as the birth date field in a genealogy program, which must be no later than the birth dates of the person's parents. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of accepting input data into a computer, comprising the steps of:
   presenting a component to the user, the component including an input area for accepting input data, wherein the component is subject to a constraint for the input data;
   accepting user input into the component input area; and
   following at least one assistance policy associated with the component when the user input violates the value constraint.

2. The method of claim 1, wherein the step of following the assistance policy comprises the steps of:
   receiving an input event;
   calling a validate routine from the component to determine if the input event violates the value constraint;
   calling a diagnostic routine from the component when the input event violates the value constraint according to the assistance policy; and
   calling a fix routine from the component to alter the user input to comply with the value constraint according to the assistance policy.

3. The method of claim 2, wherein the validate routine, the diagnostic routine, and the fix routine are selected from the component content type.

4. The method of claim 2, wherein the step of following the assistance policy further comprises the step of screening a non-data input key event.

5. The method of claim 2, further comprising the step of notifying a second component that the input event violates the value constraint.

6. The method of claim 1, wherein the step of following the assistance policy comprises the steps of:
   determining if the user input violates the value constraint; and
   displaying a diagnostic message adjacent to the input area when the user input violates the value constraint.

7. The method of claim 6, further comprising the step of highlighting a border of the input area.

8. The method of claim 7, further comprising the step of accepting a command to alter the user input to comply with the value constraint.

9. The method of claim 1, wherein the step of following the assistance policy comprises the steps of:
   determining if the user input violates the value constraint; and
   altering the user input to comply with the value constraint when the user input violates the value constraint.

10. The method of claim 1, wherein the user input must be a unique value and the method further comprises the steps of:
    determining if the user input is a pre-existing value; and
    displaying a diagnostic message adjacent to the input area when the user input is a pre-existing value.

11. The method of claim 1, wherein the assistance policy is selected from an assistance policy set comprising:
    a first assistance policy to automatically correct the user input to comply with the value constraint; and
    a second assistance policy to aurally signal value constraint violations.

12. The method of claim 11, wherein the assistance policy set further comprises a third assistance policy to supply a closing delimiter to the user input when the user input is a delimited SQL identifier.

13. The method of claim 11, wherein the assistance policy set further comprises a fourth assistance policy to supply a closing delimiter to the user input when the user input begins with an opening delimiter.

14. The method of claim 11, wherein the assistance policy set further comprises a fifth assistance policy to supply opening and closing delimiters when an SQL identifier is fixed.

15. The method of claim 1, wherein the step of following the assistance policy comprises the step of using a provided default value for the input data.

16. The method of claim 1, wherein the step of following the assistance policy comprises the steps of providing a series of input data based on a user-customizable stem.

17. A method of configuring a computer to accept input data, comprising the steps of:
    defining a component comprising an input area for accepting input data;
    associating the component with a constraint according to a content type of the input area; and
    associating the component with an assistance policy selected from a set of one or more assistance policies.

18. An apparatus for accepting input data into a computer, comprising:

means for presenting a component to the user, the component including an input area for accepting input data, wherein the component is subject to a constraint for the input data according to a component content type;

means for accepting user input into the component input area; and means for following an assistance policy associated with the component when the user input violates the value constraint.

19. The apparatus of claim 18, wherein the means for following the assistance policy comprises:

means for receiving an input event;

means for calling a validate routine from the component to determine if the input event violates the value constraint;

means for calling a diagnostic routine from the component when the input event violates the value constraint according to the assistance policy; and means for calling a fix routine from the component to alter the user input to comply with the value constraint according to the assistance policy.

20. The apparatus of claim 19, wherein the validate routine, the diagnostic routine, and the fix routine are selected from the component content type.

21. The apparatus of claim 19, wherein the means for following the assistance policy further comprises means for screening a non-data input key event.

22. The apparatus of claim 19, further comprising a means for notifying a second component that the input event violates the value constraint.

23. The apparatus of claim 18, wherein the means for following the assistance policy comprises:

means for determining if the user input violates the value constraint; and means for displaying a diagnostic message adjacent to the input area when the user input violates the value constraint.

24. The apparatus of claim 23, further comprising means for highlighting a border of the input area.

25. The apparatus of claim 24, further comprising means for accepting a command to alter the user input to comply with the value constraint.

26. The apparatus of claim 18, wherein the means for following the assistance policy comprises:

means for determining if the user input violates the value constraint; and means for altering the user input to comply with the value constraint when the user input violates the value constraint.

27. The apparatus of claim 18, wherein the user input must be a unique value and the apparatus further comprises:

means for determining if the user input is a pre-existing value; and means for displaying a diagnostic message adjacent to the input area when the user input is a pre-existing value.

28. The apparatus of claim 18, wherein the assistance policy is selected from an assistance policy set comprising:

a first assistance policy to automatically correct the user input to comply with the value constraint; and a second assistance policy to aurally signal value constraint violations.

29. The apparatus of claim 28, wherein the assistance policy set further comprises a third assistance policy to supply a closing delimiter to the user input when the user input is a delimited SQL identifier.

30. The apparatus of claim 28, wherein the assistance policy set further comprises a fourth assistance policy to supply a closing delimiter to the user input when the user input begins with an opening delimiter.

31. The apparatus of claim 28, wherein the assistance policy set further comprises a fifth assistance policy to supply opening and closing delimiters when an SQL identifier is fixed.

32. The apparatus of claim 18, wherein the means for enforcing the assistance policy comprises means for using a provided default value for the input data.

33. The apparatus of claim 18, wherein the means for enforcing the assistance policy comprises means for providing a series of input data based on a user-customizable stem.

34. An apparatus for configuring a computer to accept input data, comprising:

means for defining a component comprising an input area for accepting input data;

means for associating the component with a constraint according to a content type of the input area; and means for associating the component with an assistance policy selected from a set of one or more assistance policies.

35. A program storage device, readable by a computer having a processor, a memory and a data storage device, tangibly embodying one or more programs of instructions executable by the computer to perform method steps of accepting input data into a computer, the method comprising the steps of:

presenting a component to the user, the component including an input area for accepting input data, wherein the component is subject to a constraint for the input data according to a component content type;

accepting user input into the component input area; and following an assistance policy associated with the component when the user input violates the value constraint.

36. The program storage device of claim 35, wherein the method step of following the assistance policy comprises the method steps of:

receiving an input event;

calling a validate routine from the component to determine if the input event violates the value constraint;

calling a diagnostic routine from the component when the input event violates the value constraint according to the assistance policy; and calling a fix routine from the component to alter the user input to comply with the value constraint according to the assistance policy.

37. The program storage device of claim 36, wherein the validate routine, the diagnostic routine, and the fix routine are selected from the component content type.

38. The program storage device of claim 36, wherein the method step of following the assistance policy further comprises the method step of screening a non-data input key event.

39. The program storage device of claim 36, wherein the method steps further comprise the method step of notifying a second component that the input event violates the value constraint.

40. The program storage device of claim 35, wherein the method step of following the assistance policy comprises the method steps of:

determining if the user input violates the value constraint; and displaying a diagnostic message adjacent to the input area when the user input violates the value constraint.

41. The program storage device of claim 40, wherein the method steps further comprise the method step of highlighting a border of the input area.

42. The program storage device of claim 41, wherein the method steps further comprise the method step of accepting a command to alter the user input to comply with the value constraint.

43. The program storage device of claim 35, wherein the method step of following the assistance policy comprises the method steps of:

determining if the user input violates the value constraint; and altering the user input to comply with the value constraint when the user input violates the value constraint.

44. The program storage device of claim 35, wherein the user input must be a unique value and the method steps further comprise the method steps of:

determining if the user input is a pre-existing value; and displaying a diagnostic message adjacent to the input area when the user input is a pre-existing value.

45. The program storage device of claim 35, wherein the assistance policy is selected from an assistance policy set comprising:

a first assistance policy to automatically correct the user input to comply with the value constraint; and a second assistance policy to aurally signal value constraint violations.

46. The program storage device of claim 45, wherein the assistance policy set further comprises a third assistance policy to supply a closing delimiter to the user input when the user input is a delimited SQL identifier.

47. The program storage device of claim 45, wherein the assistance policy set further comprises a fourth assistance policy to supply a closing delimiter to the user input when the user input begins with an opening delimiter.

48. The program storage device of claim 45, wherein the assistance policy set further comprises a fifth assistance policy to supply opening and closing delimiters when an SQL identifier is fixed.

49. The program storage device of claim 35, wherein the method step of enforcing the assistance policy comprises the method step of using a provided default value for the input data.

50. The program storage device of claim 35, wherein the method step of enforcing the assistance policy comprises the method steps of providing a series of input data based on a user-customizable stem.

51. A program storage device, readable by a computer having a processor, a memory and a data storage device, tangibly embodying one or more programs of instructions executable by the computer to perform method steps of configuring a computer to accept input data, the method steps comprising the method steps of:

defining a component comprising an input area for accepting input data;

associating the component with a constraint according to a content type of the input area; and associating the component with an assistance policy selected from a set of one or more assistance policies.

* * * * *